(12) United States Patent
Burton et al.

(10) Patent No.: US 12,091,072 B2
(45) Date of Patent: Sep. 17, 2024

(54) POWERED LIFTING HAND TRUCK APPARATUS, SYSTEM, AND METHOD

(71) Applicant: Magline, Inc., Standish, MI (US)

(72) Inventors: Stewart A. Burton, Midland, MI (US); Michael James Casey, Bedford, NH (US)

(73) Assignee: Magline, Inc., Standish, MI (US)

( * ) Notice: Subject to any disclaimer, the term of this patent is extended or adjusted under 35 U.S.C. 154(b) by 756 days.

(21) Appl. No.: 17/226,383

(22) Filed: Apr. 9, 2021

(65) Prior Publication Data

US 2021/0316772 A1 Oct. 14, 2021

Related U.S. Application Data

(60) Provisional application No. 63/008,135, filed on Apr. 10, 2020.

(51) Int. Cl.
*B62B 1/12* (2006.01)
*B62B 1/26* (2006.01)
(Continued)

(52) U.S. Cl.
CPC .............. *B62B 1/12* (2013.01); *B62B 1/264* (2013.01); *B62B 5/025* (2013.01);
(Continued)

(58) Field of Classification Search
CPC .......... B62B 1/12; B62B 1/264; B62B 5/025; B62B 2202/023; B62B 2206/003; B62B 2206/06; B62B 1/14; B62B 5/02; B62B 2203/10; B62B 2205/32; B62B 2301/256; F16H 25/20; F16H 2025/2081; F16H 2025/2096; B66F 9/06
See application file for complete search history.

(56) References Cited

U.S. PATENT DOCUMENTS 3,745,840 A * 7/1973 Guralnick ............... F16H 25/24
74/89.32
4,577,463 A 3/1986 Kedem
(Continued)

FOREIGN PATENT DOCUMENTS

CN 107188089 A 9/2017
CN 108975211 A 12/2018
(Continued)

OTHER PUBLICATIONS

International Search Report & Written Opinion dated Jul. 23, 2021, Application No. PCT/US2021/026541.

*Primary Examiner* — Santosh R Poudel
(74) *Attorney, Agent, or Firm* — The Dobrusin Law Firm, PC

(57) ABSTRACT

A powered lift hand truck with a corresponding method of operation and control. The apparatus includes a powered lift hand truck configured to lift a load from a lowered to a raised position (and vice versa). The system uses the rotational speed to measure linear speed and enforce a consistent speed of the load. The system is programmed to lift/lower loads at the same speed, regardless of load overall weight. If, for example, the load is heavy, the system determines that the speed is below a predetermined threshold and increases the power so as to increase speed.

9 Claims, 27 Drawing Sheets

(51) Int. Cl.
*B62B 5/02* (2006.01)
*F16H 25/20* (2006.01)
(52) U.S. Cl.
CPC ... *B62B 2202/023* (2013.01); *B62B 2206/003* (2013.01); *B62B 2206/06* (2013.01); *F16H 25/20* (2013.01); *F16H 2025/2081* (2013.01); *F16H 2025/2096* (2013.01)

(56) References Cited

U.S. PATENT DOCUMENTS

| | | | |
|---|---|---|---|
| 6,530,740 B2 | 3/2003 | Kim | |
| 7,823,893 B2 | 11/2010 | Meyers et al. | |
| 8,840,121 B2 | 9/2014 | Reeves | |
| 8,905,701 B2 | 12/2014 | Van Der Helm | |
| 9,233,699 B2 | 1/2016 | Murphy | |
| 9,663,129 B1 | 5/2017 | Allen | |
| 2005/0110232 A1 | 5/2005 | DiBenedetto | |
| 2011/0130865 A1* | 6/2011 | Setzer, Sr. | B66F 9/08 700/213 |
| 2011/0276181 A1 | 11/2011 | Lamb et al. | |
| 2011/0300801 A1 | 12/2011 | Kerselaers | |
| 2013/0181418 A1* | 7/2013 | Burton | B62B 1/12 280/47.19 |
| 2017/0028124 A1* | 2/2017 | Deak | A61M 5/1684 |
| 2017/0151704 A1* | 6/2017 | Go | B29C 48/266 |
| 2018/0170417 A1 | 6/2018 | Casey | |
| 2018/0259050 A1* | 9/2018 | Gnebner | F16H 48/34 |
| 2021/0187454 A1* | 6/2021 | Panattoni | G01N 35/00732 |
| 2023/0069904 A1* | 3/2023 | Hoffman | A63C 17/02 |

FOREIGN PATENT DOCUMENTS

| | | | |
|---|---|---|---|
| GB | 2553080 A | 2/2018 | |
| WO | WO-2008018167 A1 * | 2/2008 | F01D 25/16 |

* cited by examiner

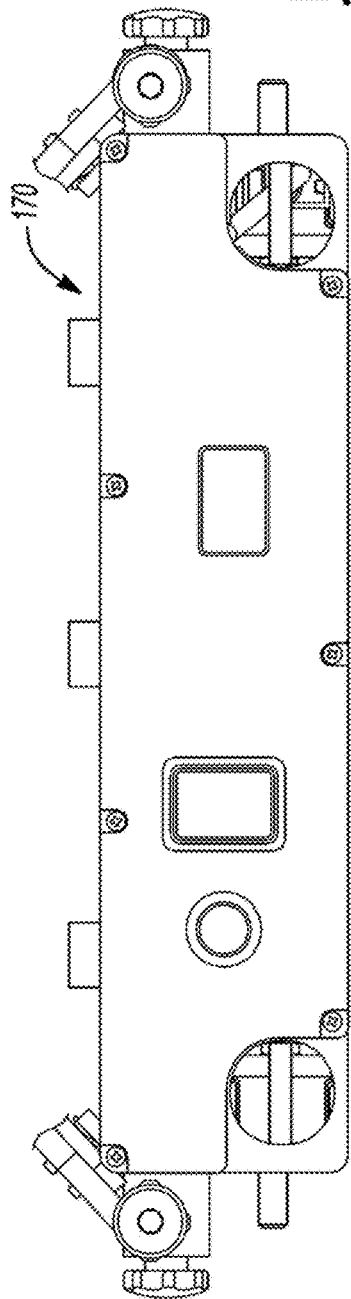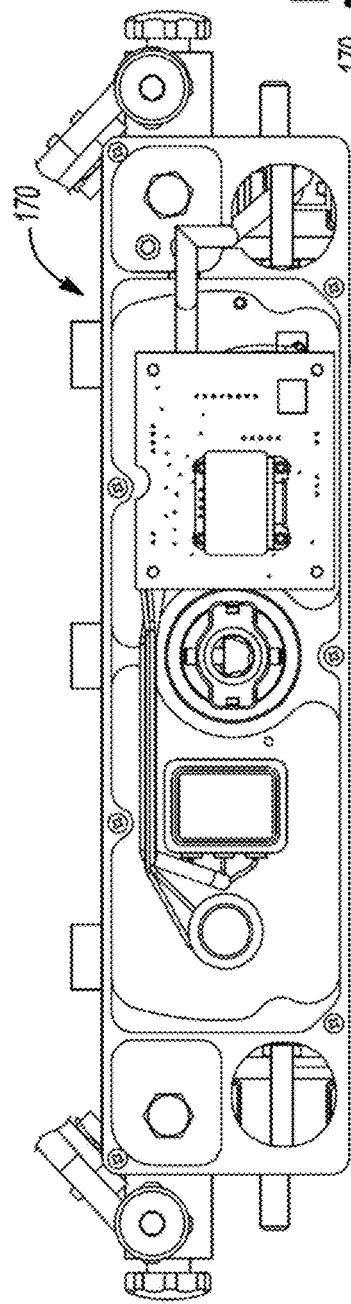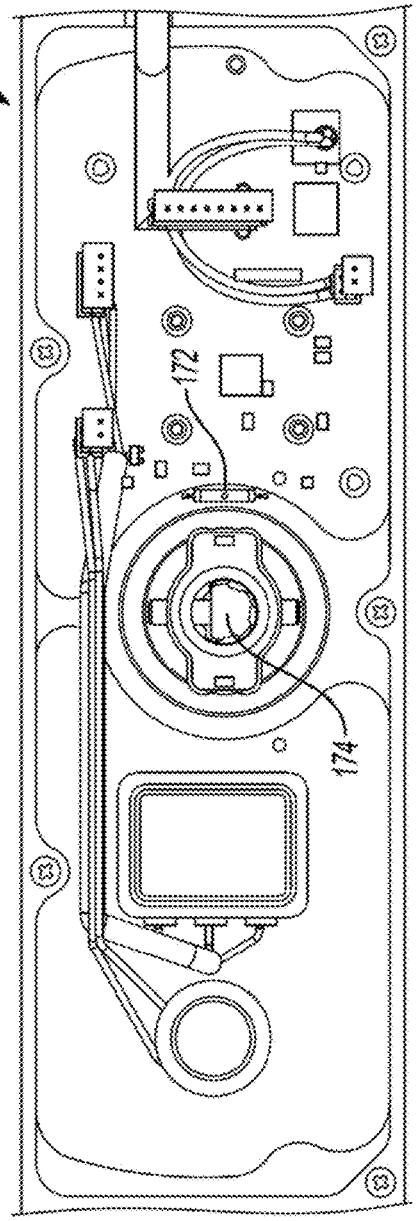

POWERED LIFTING HAND TRUCK APPARATUS, SYSTEM, AND METHOD

CROSS REFERENCE TO RELATED APPLICATIONS

This application claims priority and benefit to Provisional Patent Application Ser. No. 63/008,135 filed Apr. 10, 2020 and is incorporated herein by reference.

TECHNICAL FIELD

The present disclosure relates generally to hand truck. More specifically, the present disclosure relates to a powered lifting hand truck having a means to control the speed of a moving load on a hand truck.

BACKGROUND

A hand tuck, also known as a two-wheeler, stack truck, trundler, box cart, sack barrow, cart, dolly, sack truck, or bag barrow, is a commonly known as a L-shaped object-moving handcart with handles at one end, wheels at the base, with a small ledge to set objects on, flat against the floor when the hand-truck is upright. The objects to be moved are tilted forward, the ledge is inserted underneath them, and the objects allowed to tilt back and rest on the ledge. The truck and object are then tilted backward until the weight is balanced over the large wheels, making otherwise bulky and heavy objects easier to move.

While commonly known hand trucks are useful, objects or loads having significant weight are difficult to maneuver and lift. Accordingly, a need exists in the art for improved hand trucks and hand truck features and systems.

SUMMARY

A system for controlling lifting speed of a load bearing portion of a hand truck operated by a user, the system including a lifting portion, the lifting portion configured to move a load from a first position to a second position, a lead screw, the lead screw integral to the movement of the lifting portion, a control portion, the control portion configured to receive a desired linear speed from the user, the desired speed having a corresponding desired rotational speed, a sensor, the sensor measuring an actual rotational speed of the lead screw, and a processor, the processor comparing the actual rotational speed to the desired rotational speed wherein if the actual rotational speed is less than the desired rotational speed, additional power is applied until the actual rotational speed matches the desired rotational speed, if the actual rotational speed is greater than the desired rotational speed, power is decreased until the actual rotational speed matches the desired rotational speed, and if the actual rotational speed is equal to the desired rotational speed, no action is taken. In some embodiments, the sensor is a magnetic encoder. In some embodiments, the magnetic encoder is positioned at the top of the rotating lead screw.

A method for controlling linear speed of a moving load on a hand truck operated by a user, the hand truck having a lead screw and a sensor configured to measure rotational speed, the method including the steps of: receiving a desired linear speed from the user, the desired linear speed having a corresponding desired rotational speed for the lead screw, measuring an actual rotational speed of the lead screw, and comparing the actual rotational speed to the desired rotational speed, wherein if the actual rotational speed is less than the desired rotational speed, additional power is applied until the actual rotational speed matches the desired rotational speed, if the actual rotational speed is greater than the desired rotational speed, power is decreased until the actual rotational speed matches the desired rotational speed, or if the actual rotational speed is equal to the desired rotational speed, no action is taken. In some embodiments, the sensor is a magnetic encoder. In other embodiments, the magnetic encoder is positioned at the top of the rotating lead screw.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 38 depicts the control panel of the hand truck according to one or more embodiments shown and described herein;

FIG. 39 depicts the control panel partially exposed of the hand truck according to one or more embodiments shown and described herein;

FIG. 40 depicts the control panel partially exposed illustrating the reed switch of the hand truck according to one or more embodiments shown and described herein.

DETAILED DESCRIPTION

Figure 1:
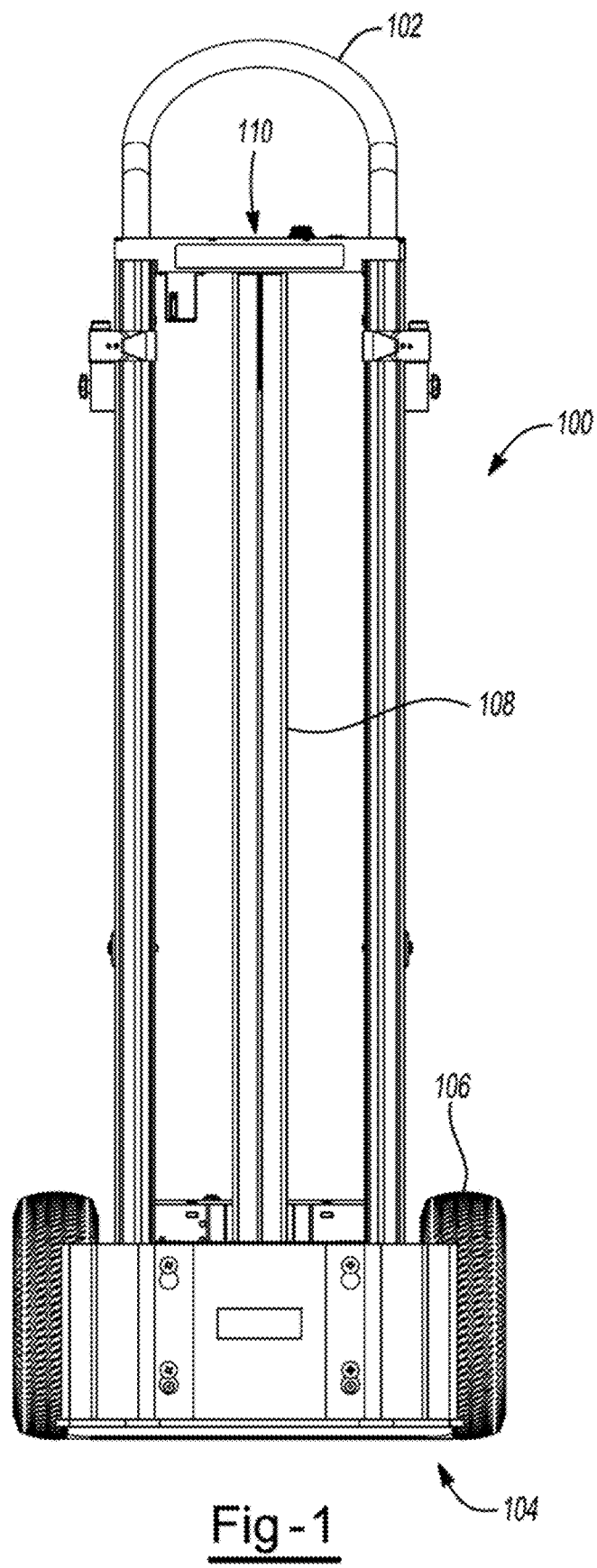
FIG. 1 depicts a front view of the hand truck as disclosed herein according to one or more embodiments shown and described herein.
Figure 2:
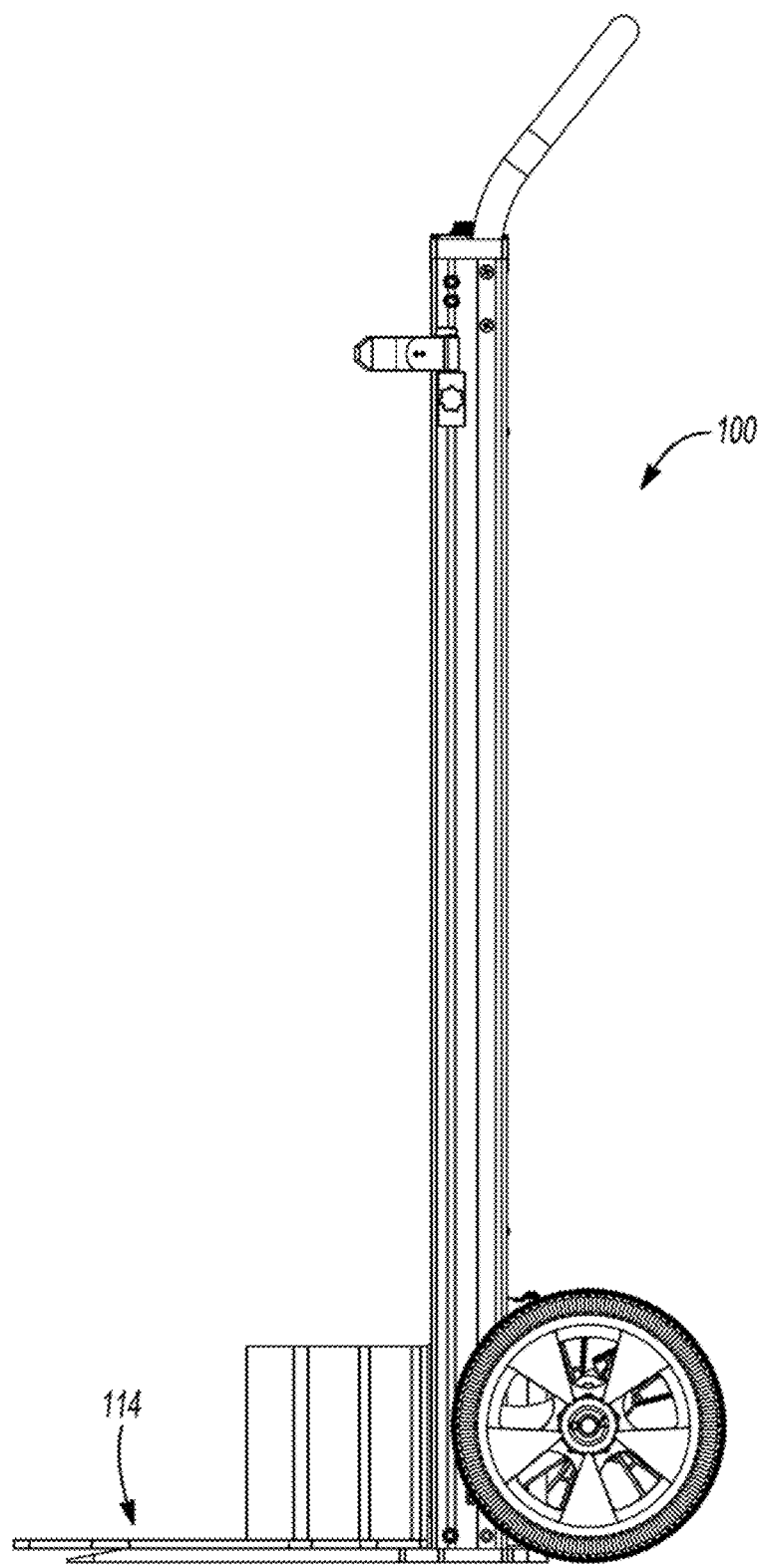
FIG. 2 depicts a side view of the hand truck as disclosed herein according to one or more embodiments shown and described herein.
Figure 3:
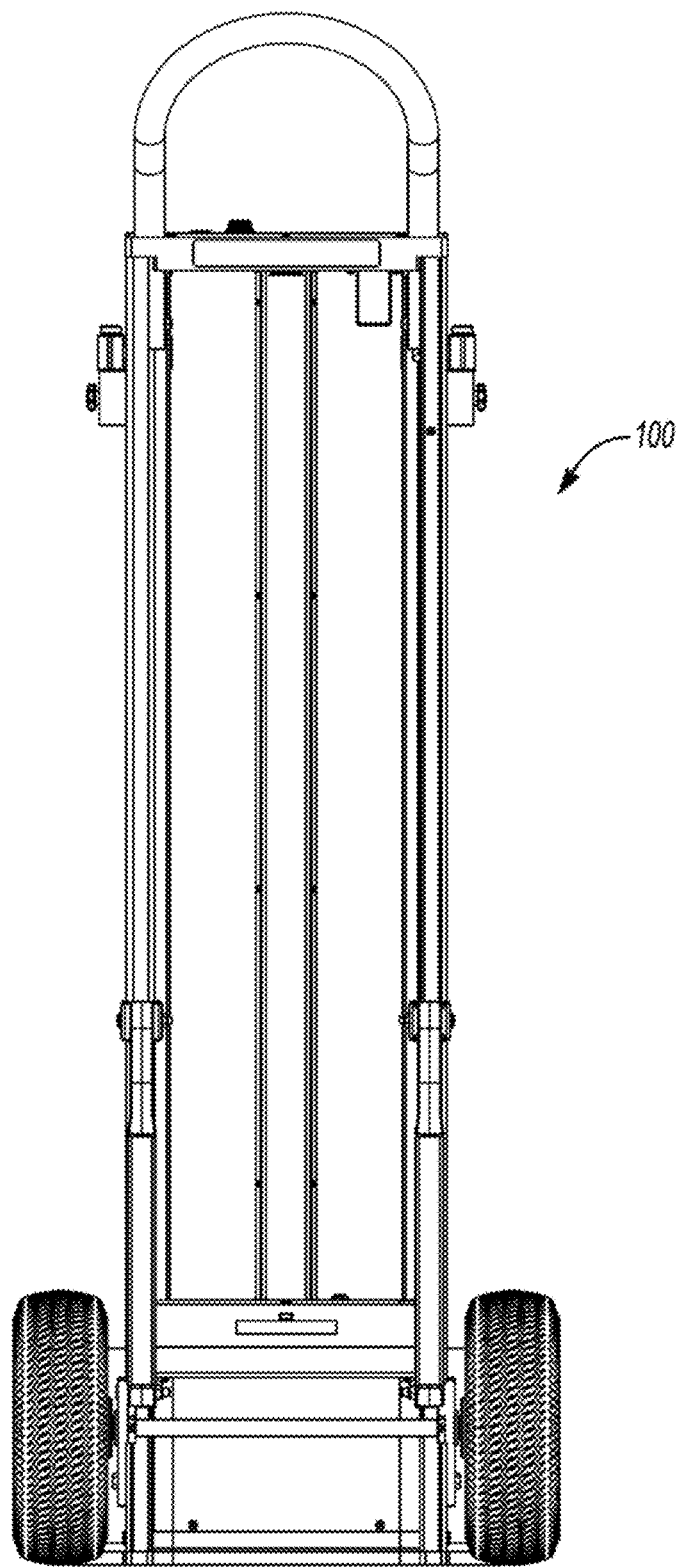
FIG. 3 depicts a rear view of the hand truck as disclosed herein according to one or more embodiments shown and described herein.
Figure 4:
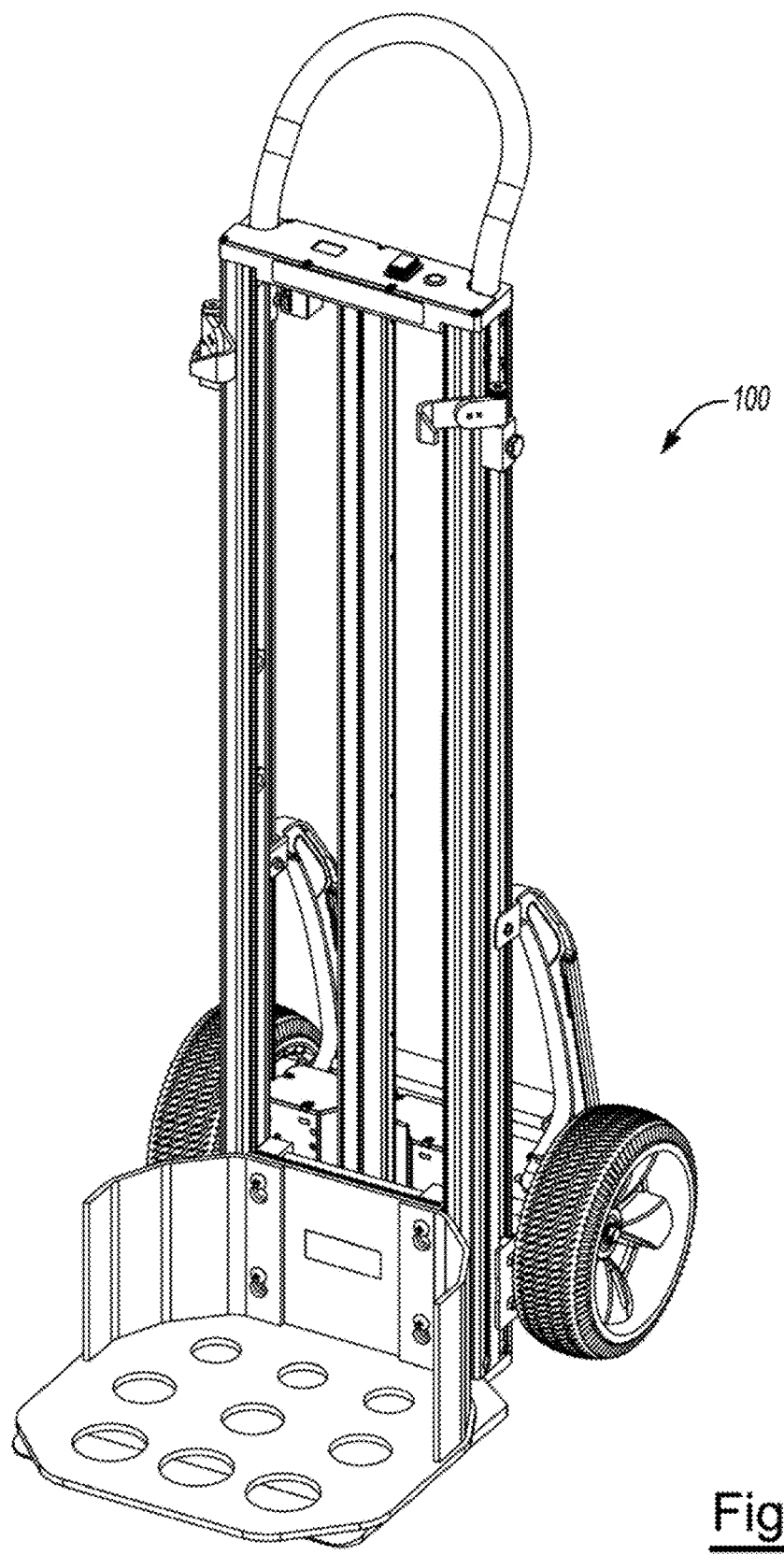
FIG. 4 depicts a perspective view of the hand truck as disclosed herein according to one or more embodiments shown and described herein.
Figure 5:
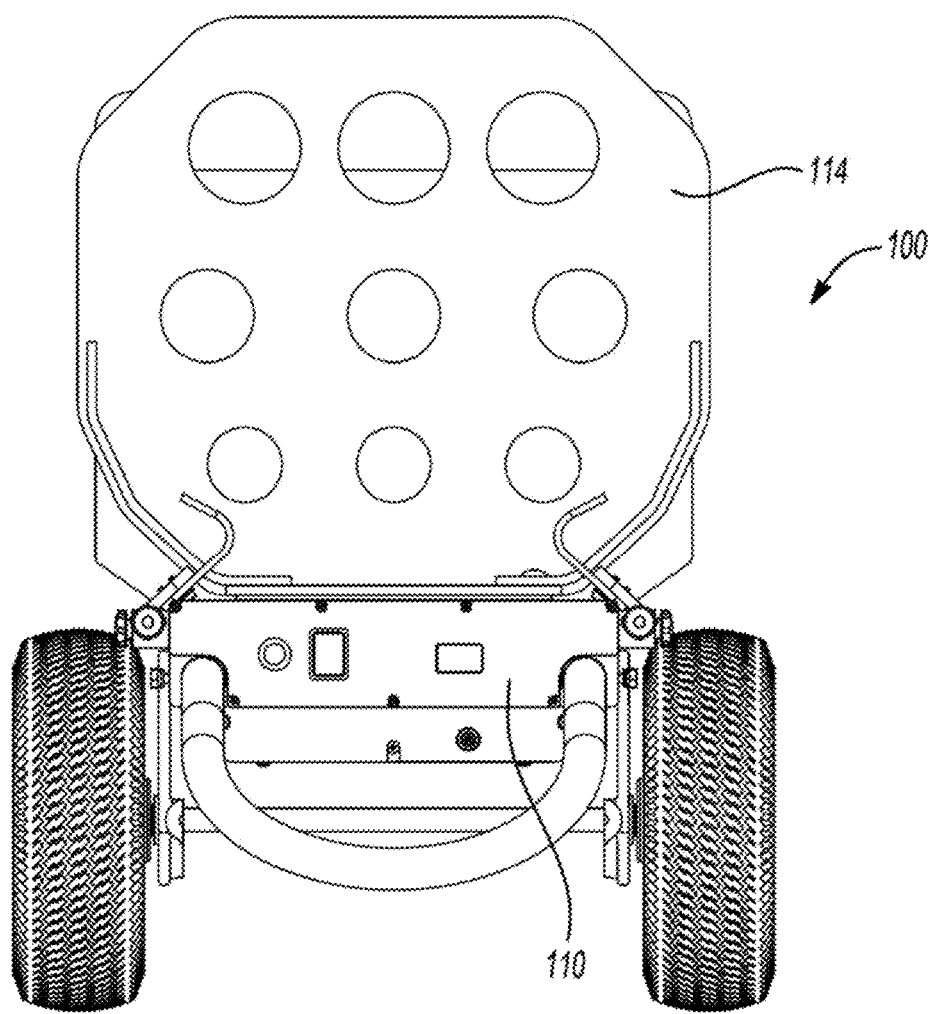
FIG. 5 depicts an elevational view of the hand truck as disclosed herein according to one or more embodiments shown and described herein.
Figure 6:
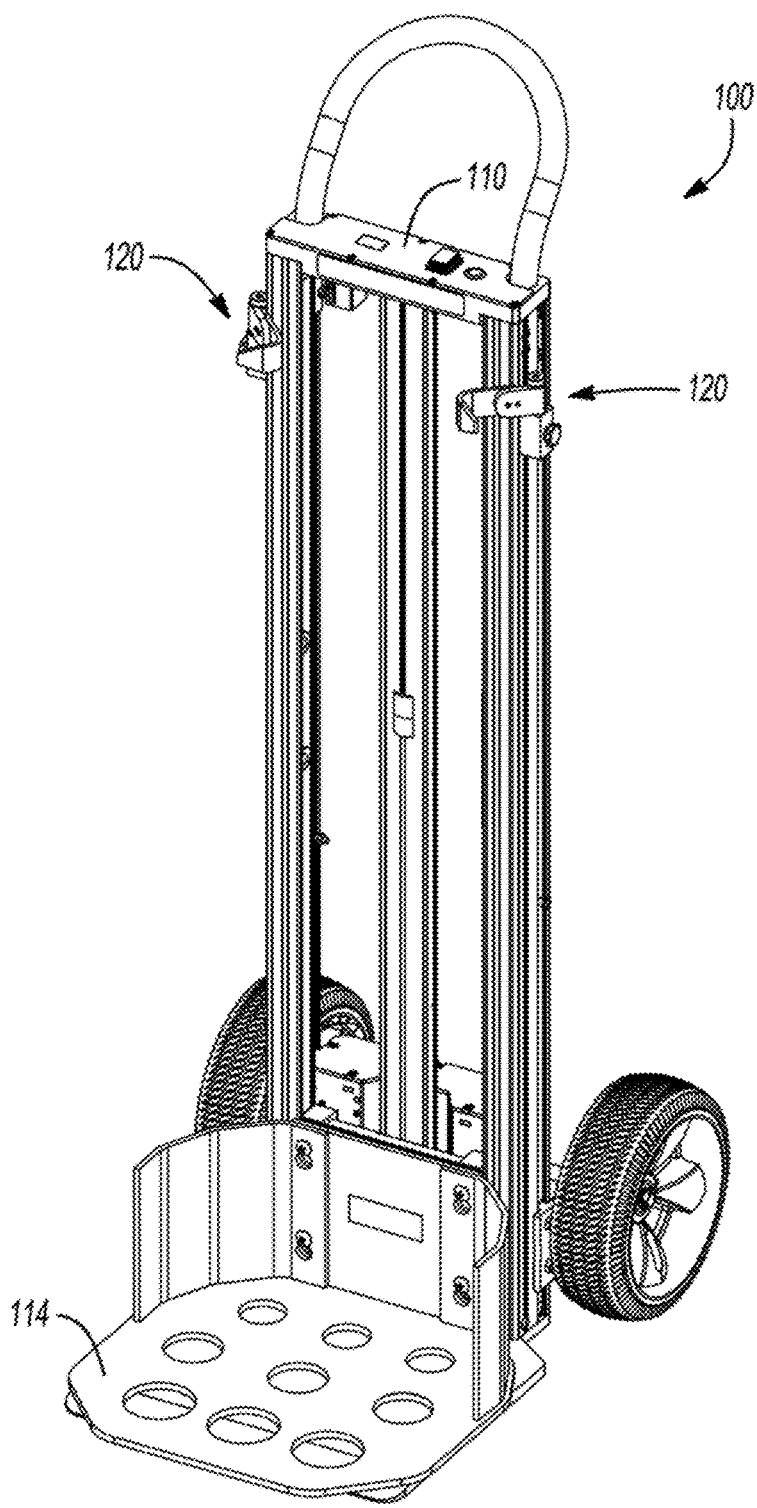
FIG. 6 depicts a perspective view of the lifting portion in a lower position according to one or more embodiments shown and described herein.
Figure 7:
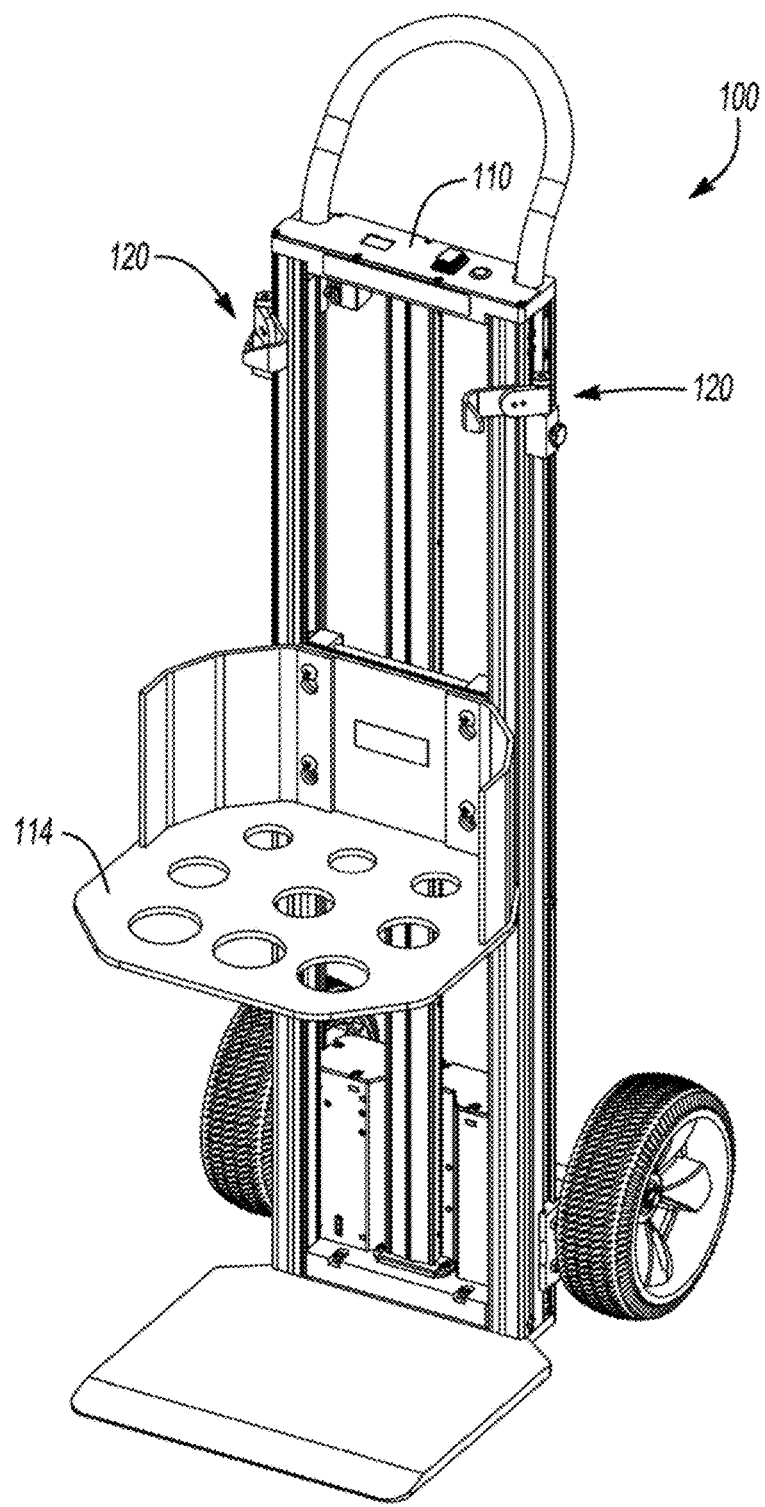
FIG. 7 depicts a perspective view of the lifting portion in a mid-position according to one or more embodiments shown and described herein.
Figure 8:
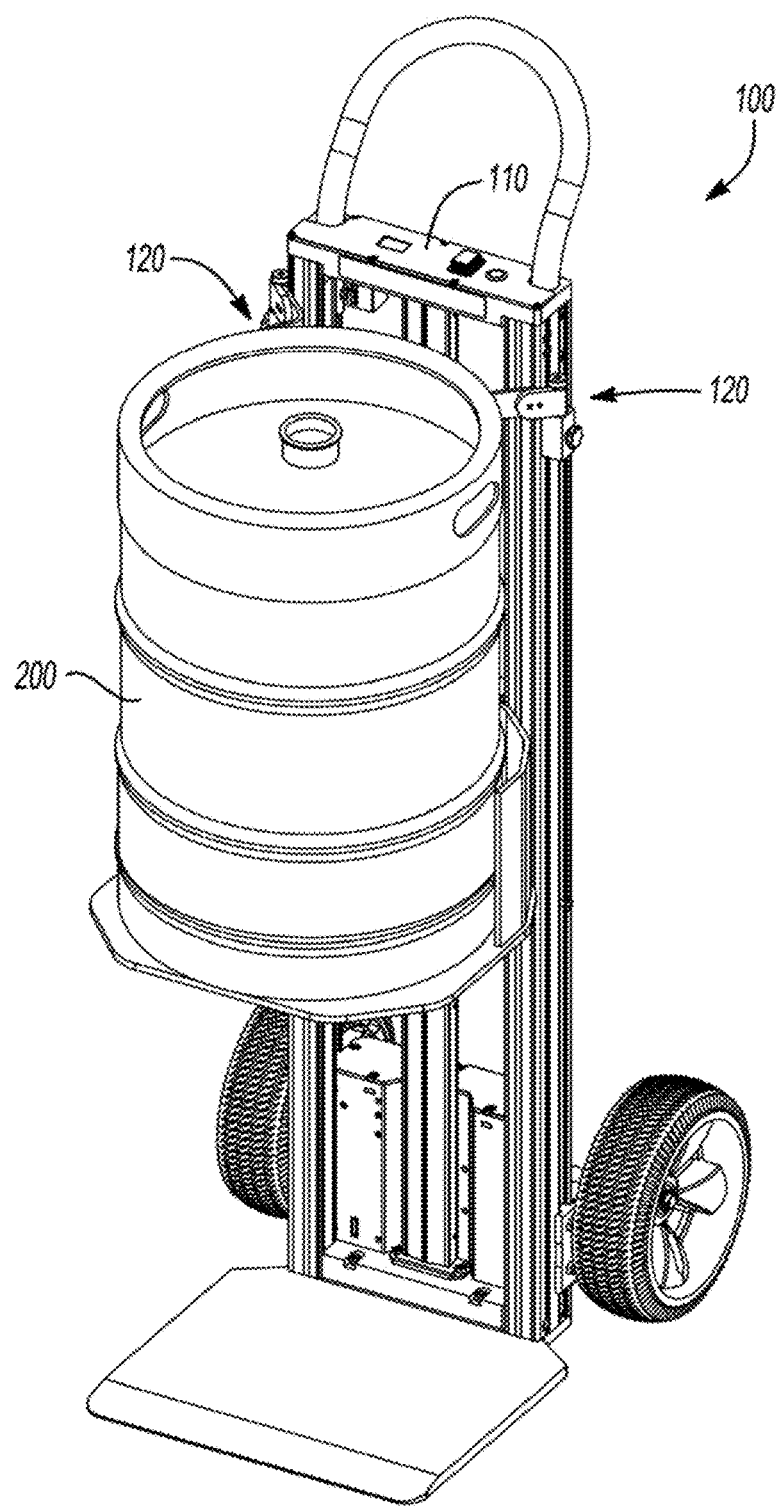
FIG. 8 depicts a perspective view of the lifting portion in an elevation position with a keg in transport according to one or more embodiments shown and described herein.
Figure 9:
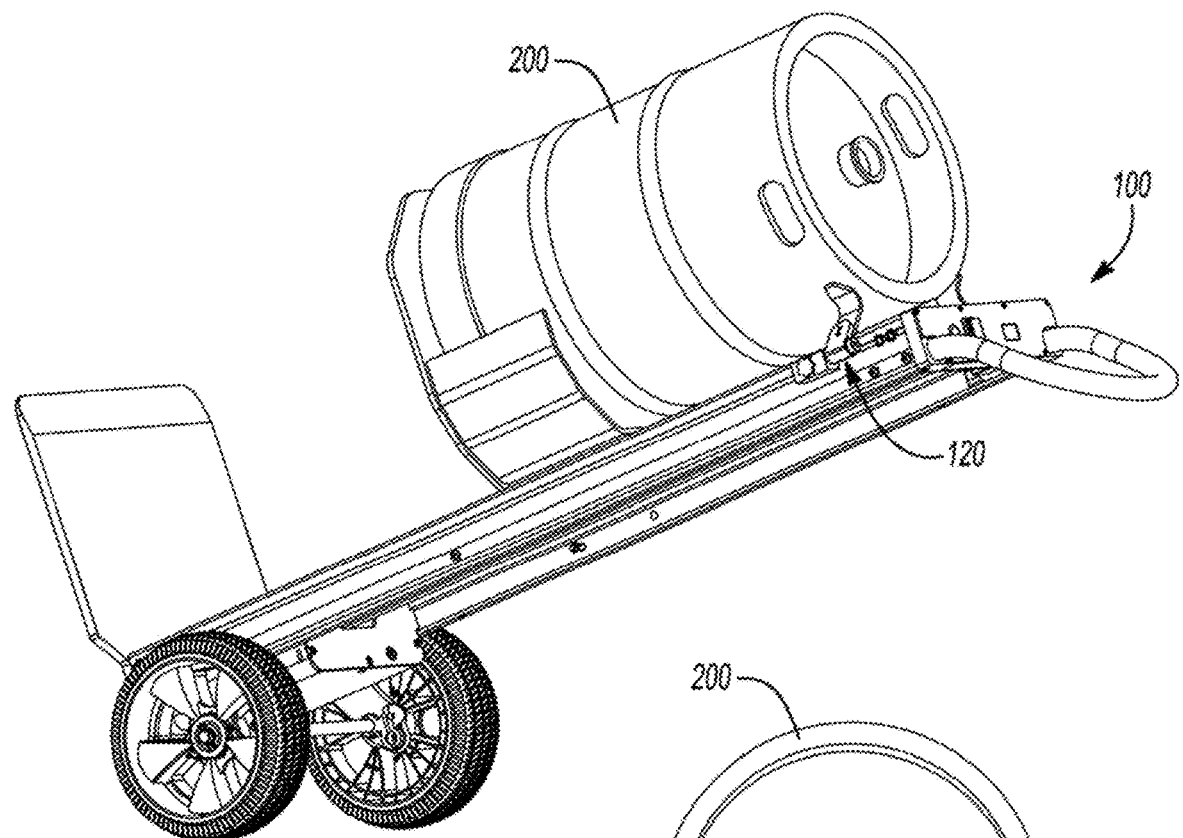
FIG. 9 depicts a perspective view of the hand truck moving a keg according to one or more embodiments shown and described herein.
Figure 10:
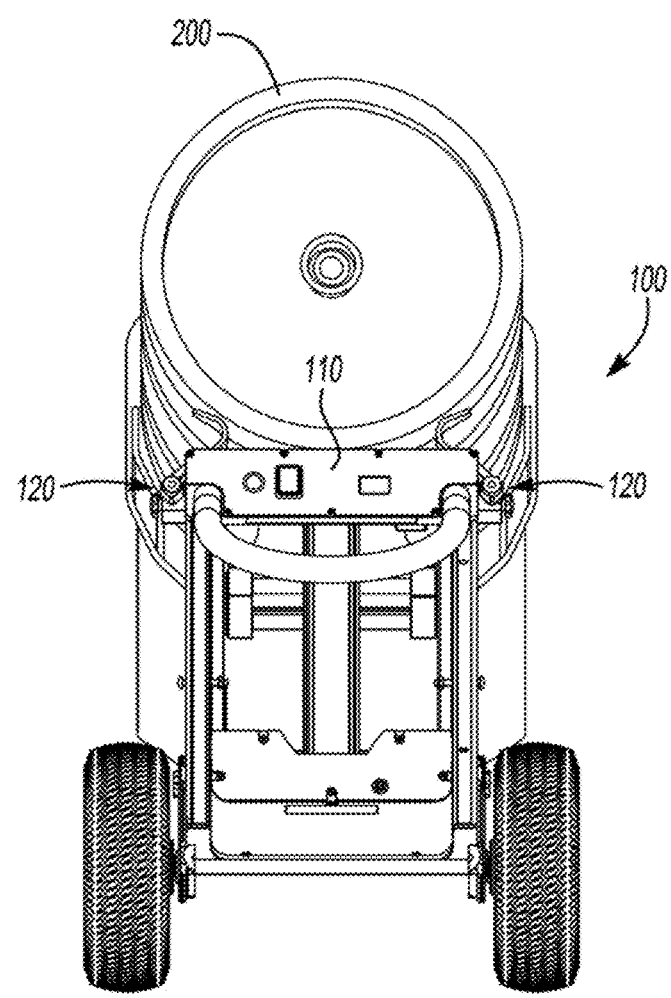
FIG. 10 depicts a perspective/elevational view of the hand truck moving a keg according to one or more embodiments shown and described herein.
Figure 11:
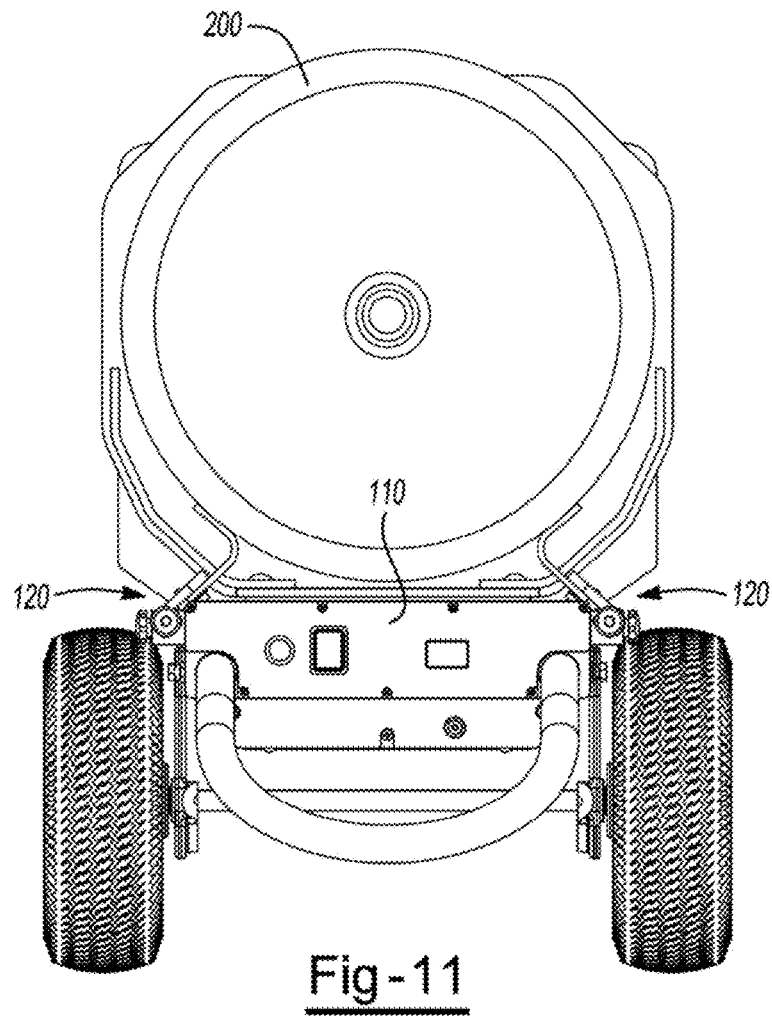
FIG. 11 depicts an elevational view of the hand truck moving a keg according to one or more embodiments shown and described herein.
Figure 12:
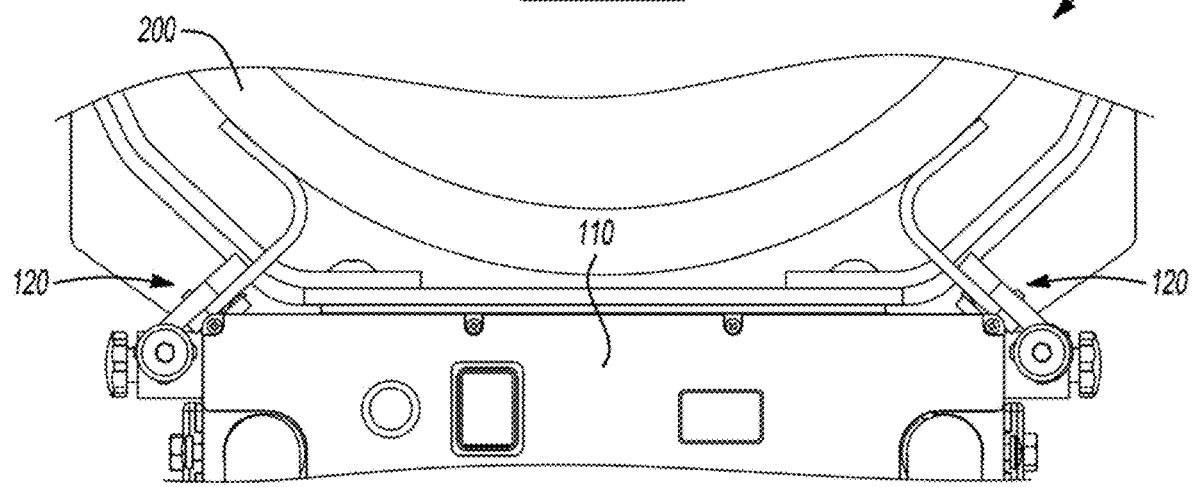
FIG. 12 depicts both upper containment pivoting spacer in operation according to one or more embodiments shown and described herein.

While several points of novelty are discussed herein, the main apparatus and system described herein is a powered lift hand truck with a corresponding method of operation and control. The apparatus includes a powered lift configured to lift a load, such as a keg, from a lowered to a raised position (and vice versa). Various novel features of said powered lift hand truck will be described in detail in the following. FIGS. 1-8 generally disclose a hand truck 100 having a handle 102 and a lifting portion 104. The hand truck is configured to hold a keg 200. The system includes an on/off switch and a programmable user interface or control panel 110 that shows remaining battery capacity and other user information as needed. The control panel also includes an up/down switch that the user presses and holds to move the lifting portion, or lifting nose, 104. The hand truck includes a pair of wheels 106 for transporting any load. A lead screw 108 acts as the drive to move the lifting nose 104 in an upward or downward motion, as desired. The lead screw 108 with travelling nut affixed to lifting nose 114.

A limit switch at the top and at the bottom of travel tell the motor to "stop", as discussed in the following. Once power is cut to the motor A mechanical brake is activated to prevent downward "back driving" of the lifting nose when under load. Further, speed is measured by a sensor, in this embodiment a magnetic encoder at the top of the rotating lead screw—sensor counts "pulses" or number of times the magnet rotates to measure speed. In some embodiments, and as described in further detail in the following, speed is controlled by software. In these embodiments, the system is programmed to begin at a slow rate with initial depression of up/down button, then accelerates to a top speed with continued depressed lift.

Pivoting Spacer

Figures 13, 14:
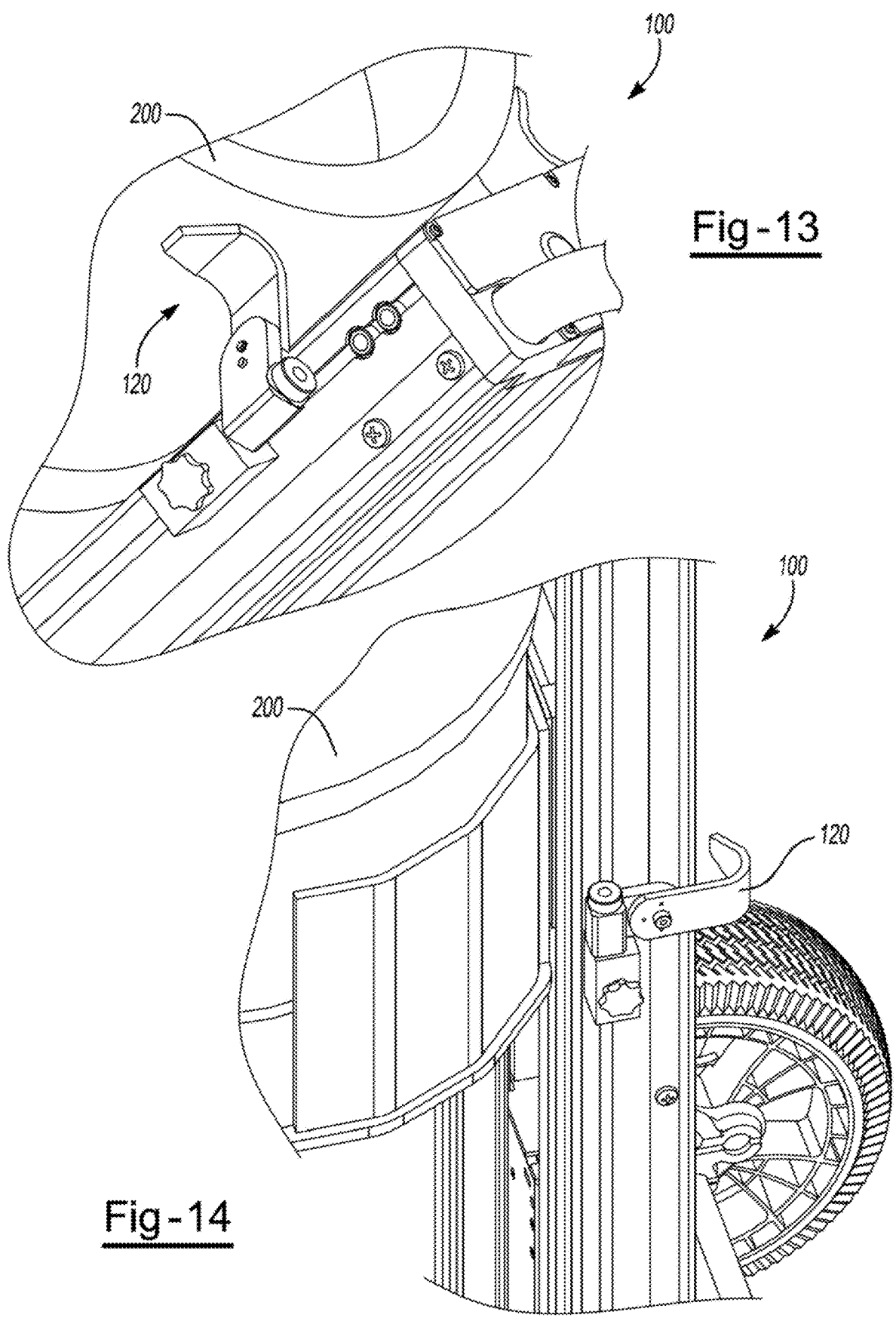
FIG. 13 depicts a close-up perspective view of the pivoting spacer of the hand truck moving a keg according to one or more embodiments shown and described herein.
FIG. 14 is a close-up perspective view of the pivoting spacer in a disengaged position according to one or more embodiments shown and described herein.
Figure 16:
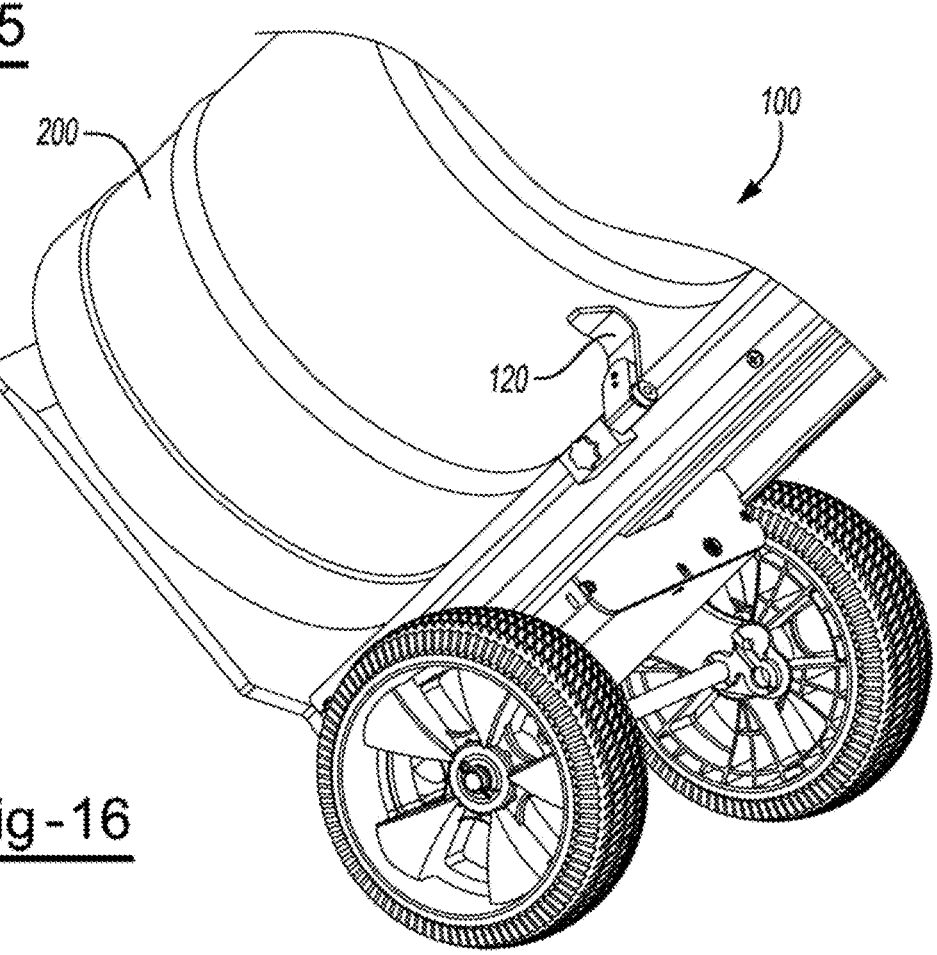
FIG. 16 is a perspective view of the pivoting spacer in use according to one or more embodiments shown and described herein.
Figure 17:
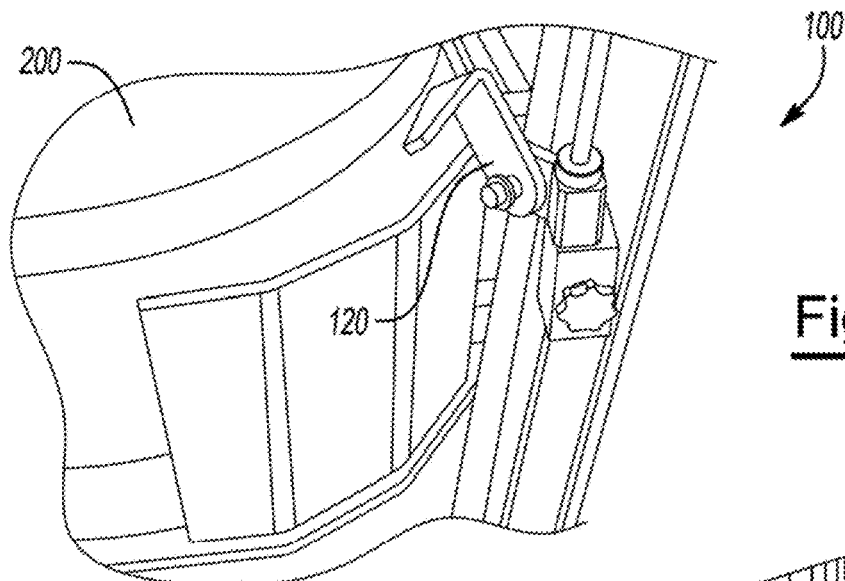
FIG. 17 is a close-up perspective view of the pivoting spacer knocked out of the way during lifting according to one or more embodiments shown and described herein.
Figure 18:
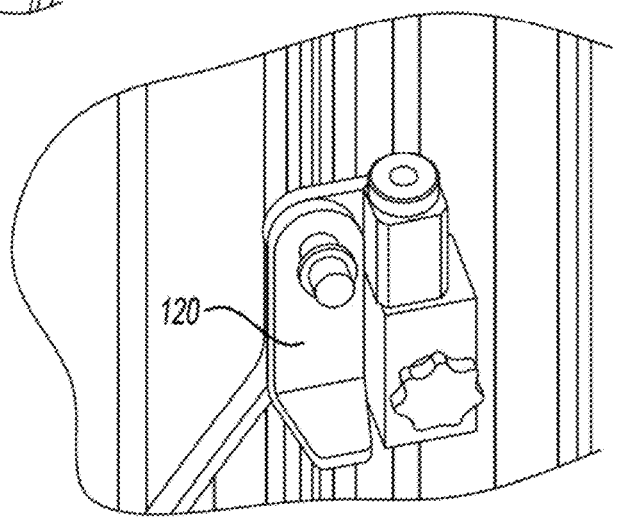
FIG. 18 is a close-up perspective view of the pivoting spacer knocked out of the way during lowering according to one or more embodiments shown and described herein.

FIGS. 9-19 depicts the hand truck 100 having a pair of pivot spacers 120. An individual pivot spacer 120 is movable from a stowed position (such as shown in FIG. 14), to a use position (such as shown in FIGS. 9-13), to a breakaway position (such as shown in FIG. 18) if the lifting plate contacts the pivot spacer 120 during lifting or lowering.

Once hand truck is broken-back to move on wheels, the kegs (or any load) shift toward frame and are too close to the lead screw and/or can shift if cart is maneuvered quickly. The present concept includes providing a pivoting spacer 120 affixed anywhere on the frame, and be pivoted away from the load when not in use (disengaged). When in use, it is pivoted forward to rest against the load, preventing the load from falling back on the lead screw, as well as centering the load. The pivoting spacer 120 will automatically retract If the load is raised or lowered with spacer engaged (breakaway feature).

Figure 15:
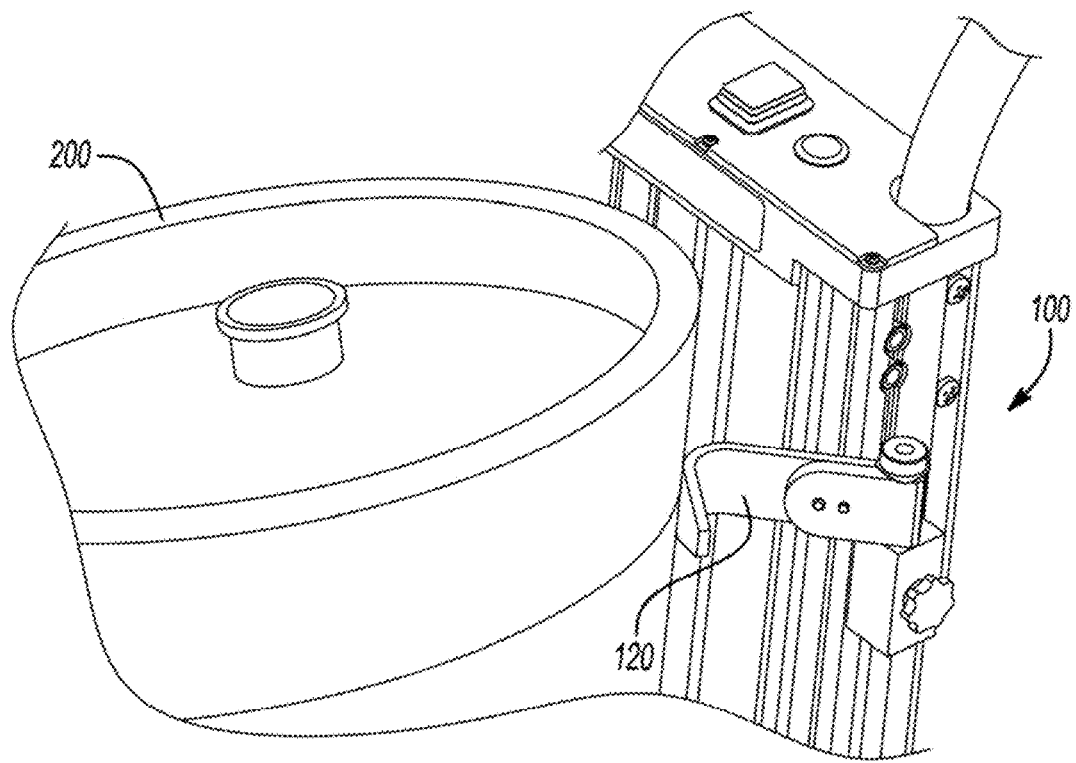
FIG. 15 is a close-up perspective view of the pivoting spacer in an engaged position according to one or more embodiments shown and described herein.
Figure 19:
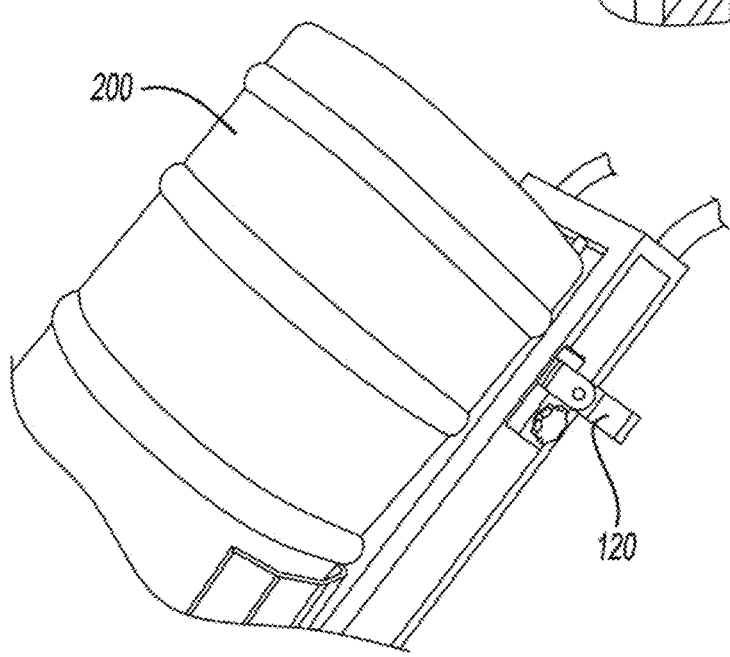
FIG. 19 is a perspective view of the keg leaning toward the lead screw when the pivoting spacer is not in use.

FIGS. 14-19 illustrate the pivoting spacer 120 in several positions. FIG. 14 depicts the pivoting spacer 120 in a disengaged or stowed position. FIGS. 15 and 16 depicts the pivoting spacer 120 in an engaged position in use. FIGS. 17 and 18 depicts the pivoting spacer 120 knocked out of the way during lifting (FIG. 17) and lowering (FIG. 18) (breakaway feature). FIG. 19 depicts a spacer 120 not engaged and the keg contacting the lead screw. The pivoting spacers 120 prevent damage to the lead screw.

Spring Isolation

Figure 20:
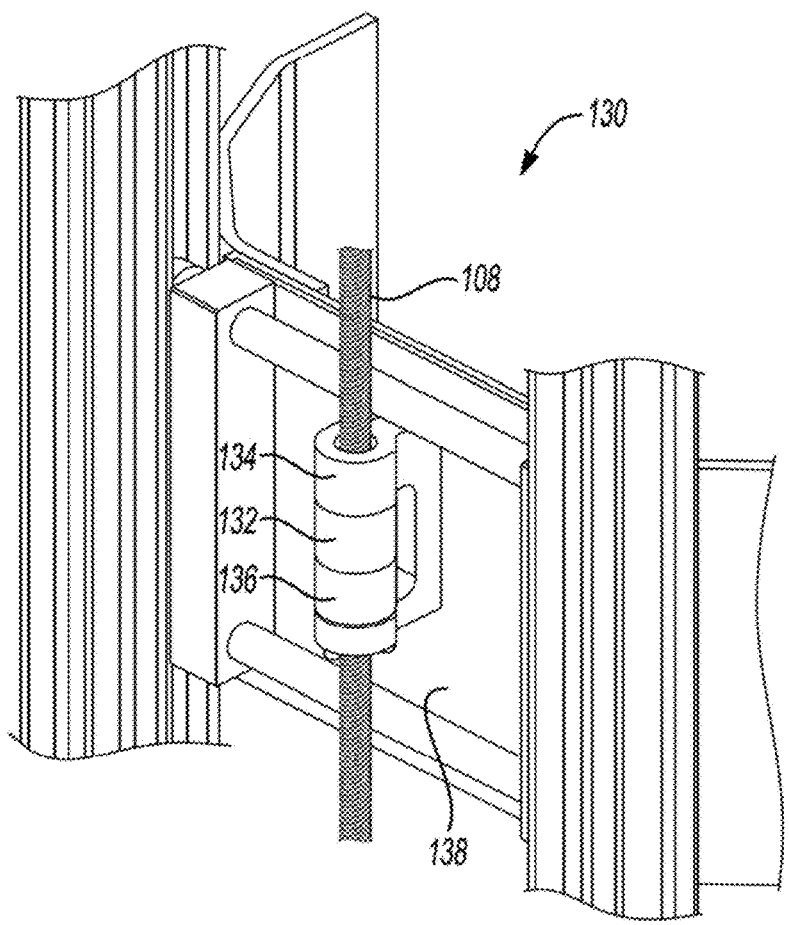
FIG. 20 depicts a perspective view of the spring of the isolation portion according to one or more embodiments shown and described herein.
Figure 21:
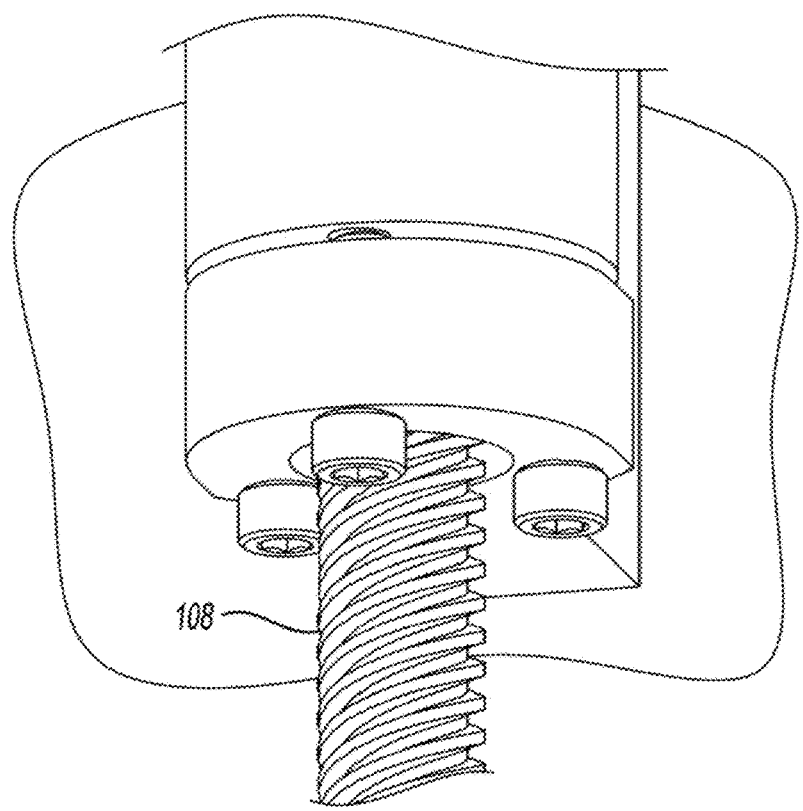
FIG. 21 depicts a close-up perspective view of the spring of the isolation portion according to one or more embodiments shown and described herein.
Figure 22:
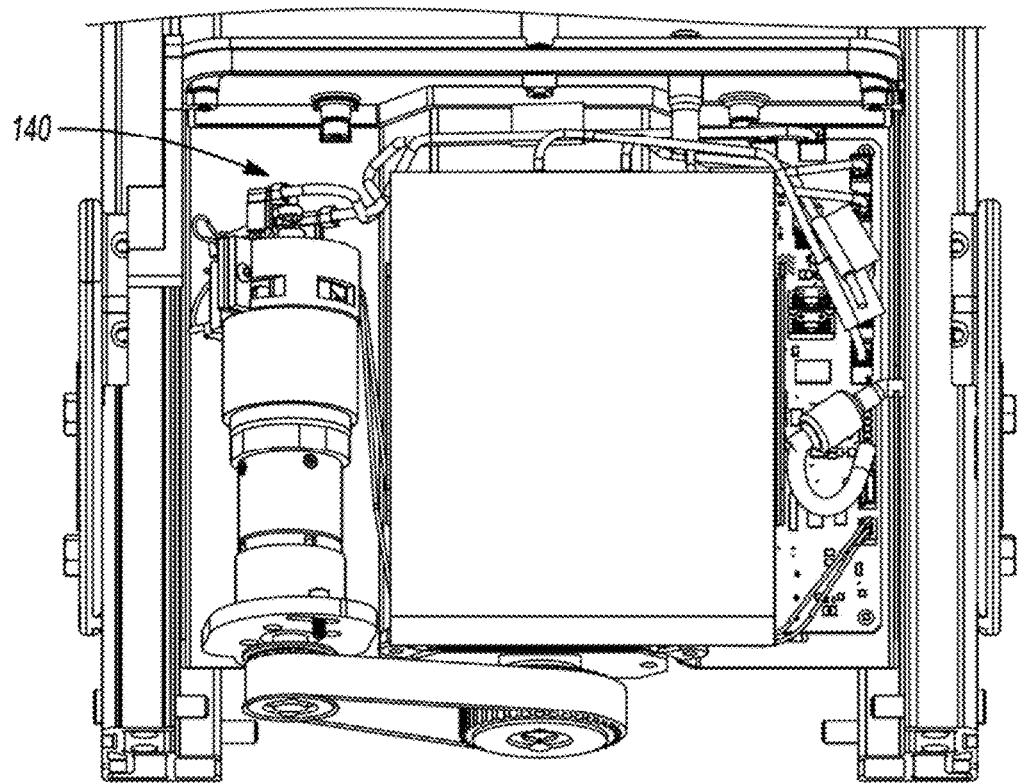
FIG. 22 depicts the motor compartment illustrating the belt/pulley according to one or more embodiments shown and described herein.
Figure 23:
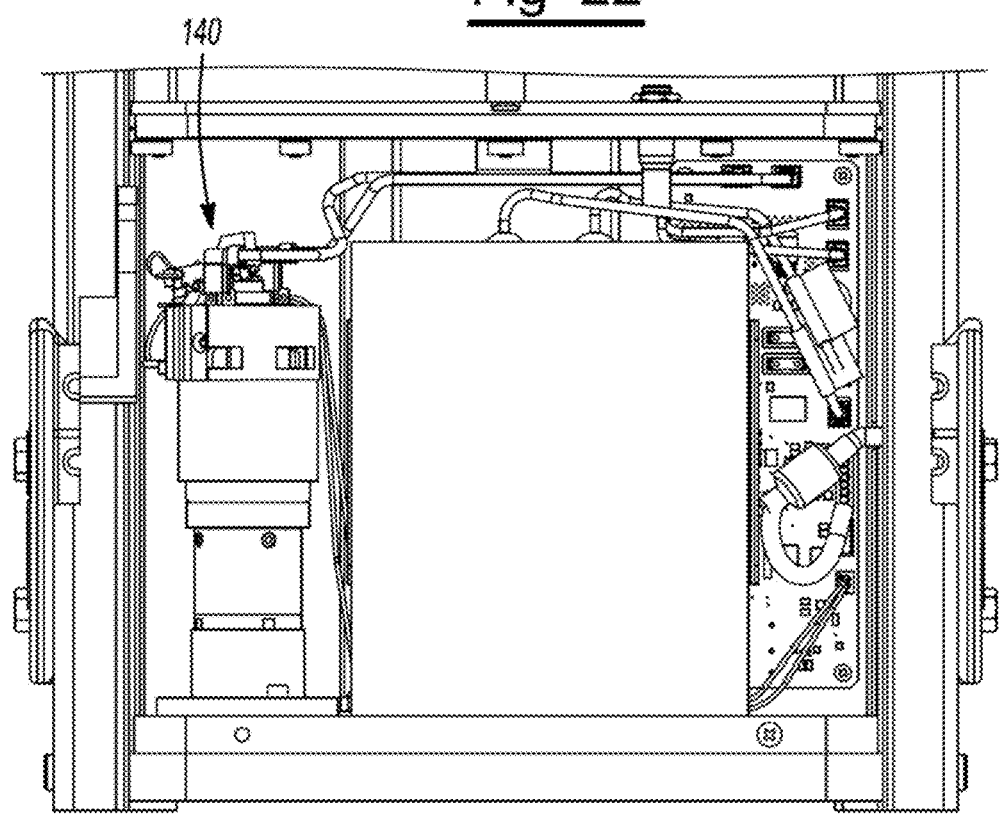
FIG. 23 depicts the motor compartment illustrating the electromechanical motor/brake according to one or more embodiments shown and described herein.
Figure 24:
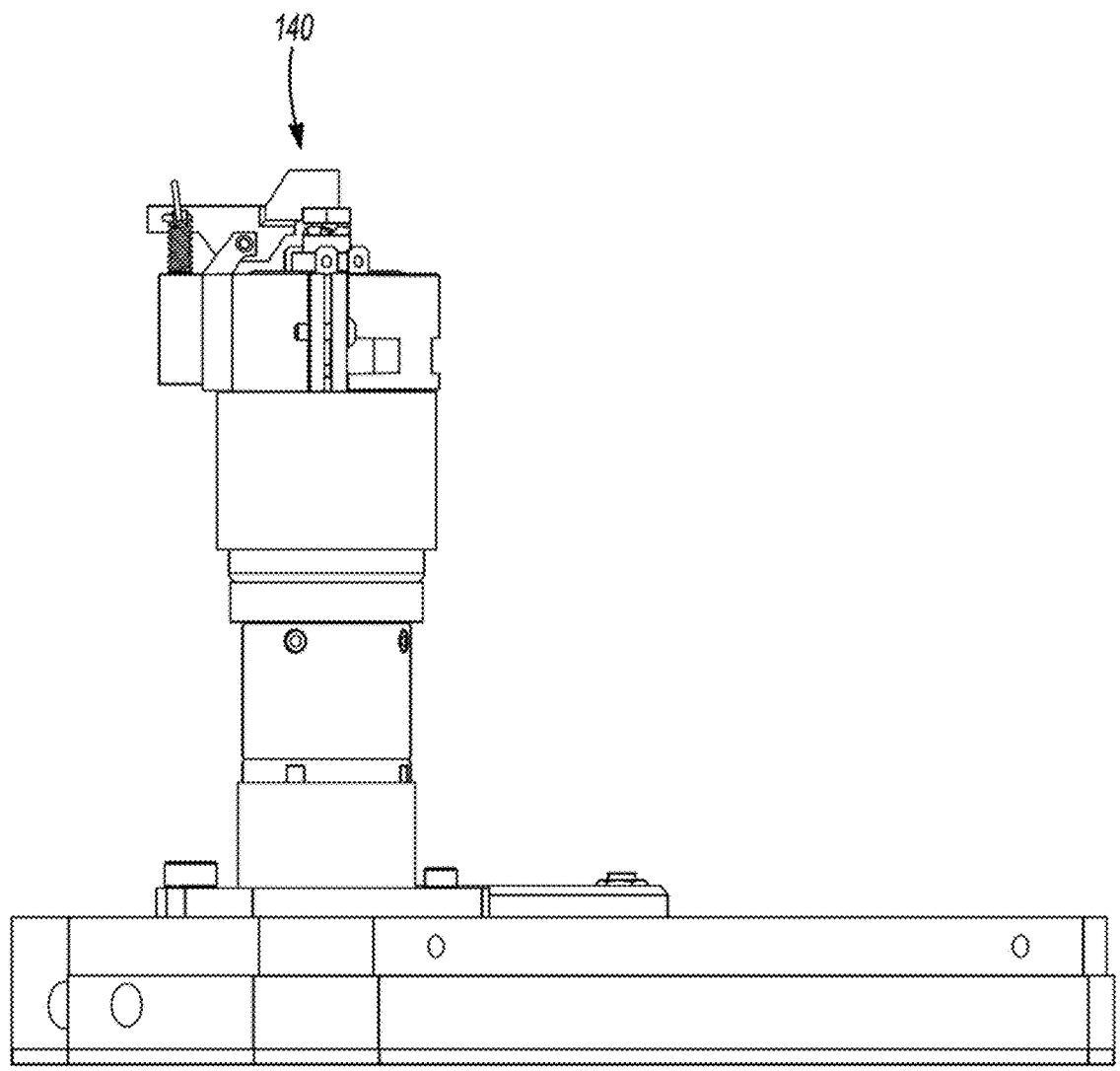
FIG. 24 depicts a lever attached to the electromechanical brake in an engaged position according to one or more embodiments shown and described herein.
Figure 25:
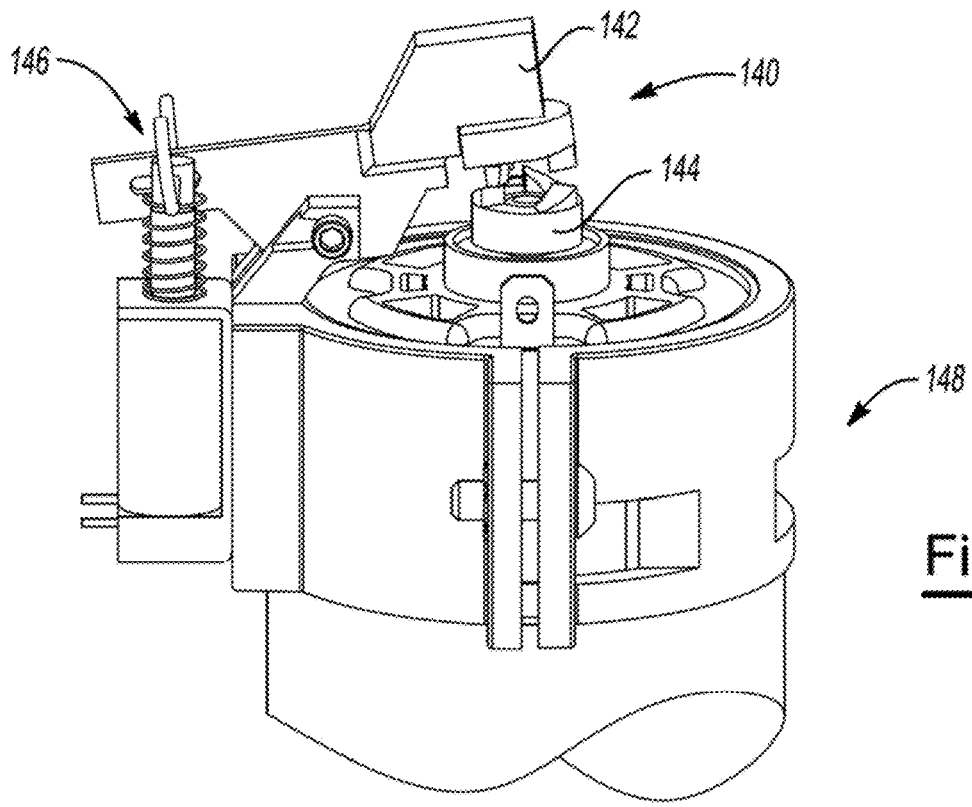
FIG. 25 depicts a lever attached to the electromechanical brake in a disengaged position according to one or more embodiments shown and described herein.
Figure 26:
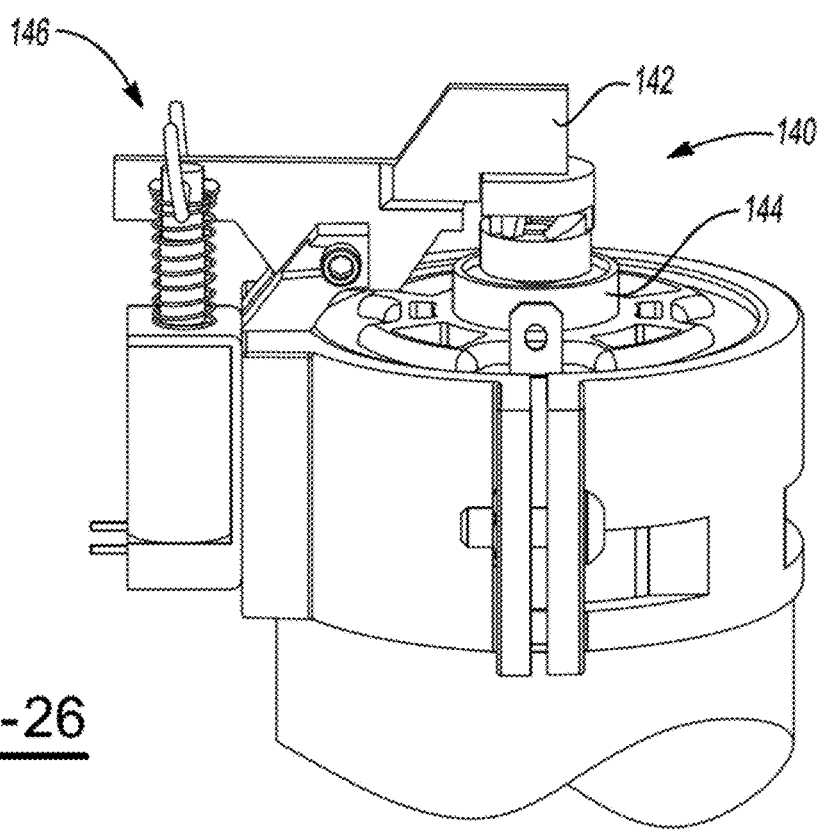
FIG. 26 depicts a lever attached to the electromechanical brake in an engaged position according to one or more embodiments shown and described herein.
Figure 27:
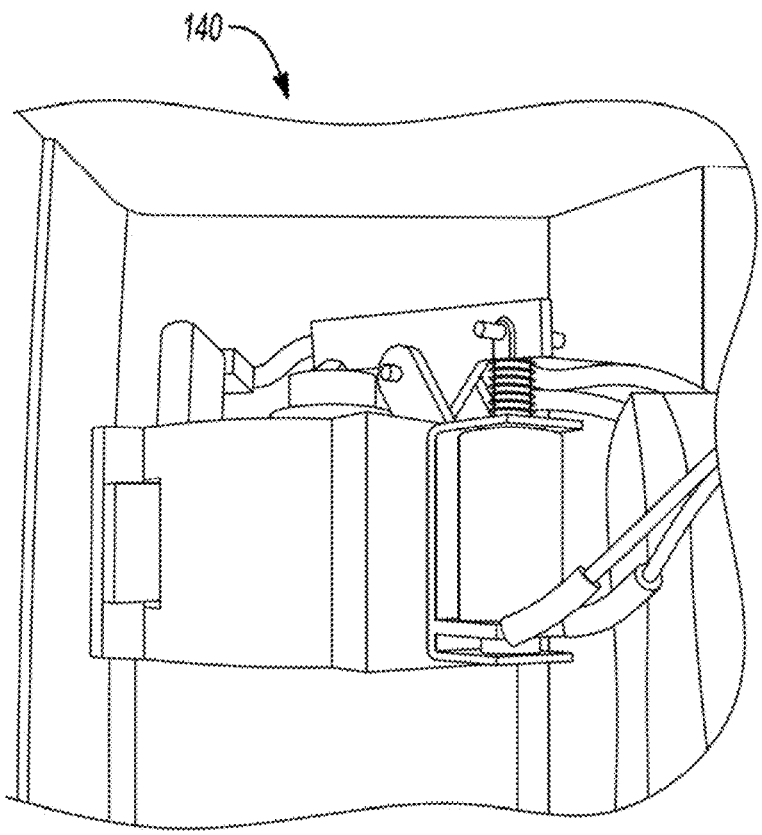
FIG. 27 depicts a lever attached to the electromechanical brake in an engaged position according to one or more embodiments shown and described herein.
Figure 28:
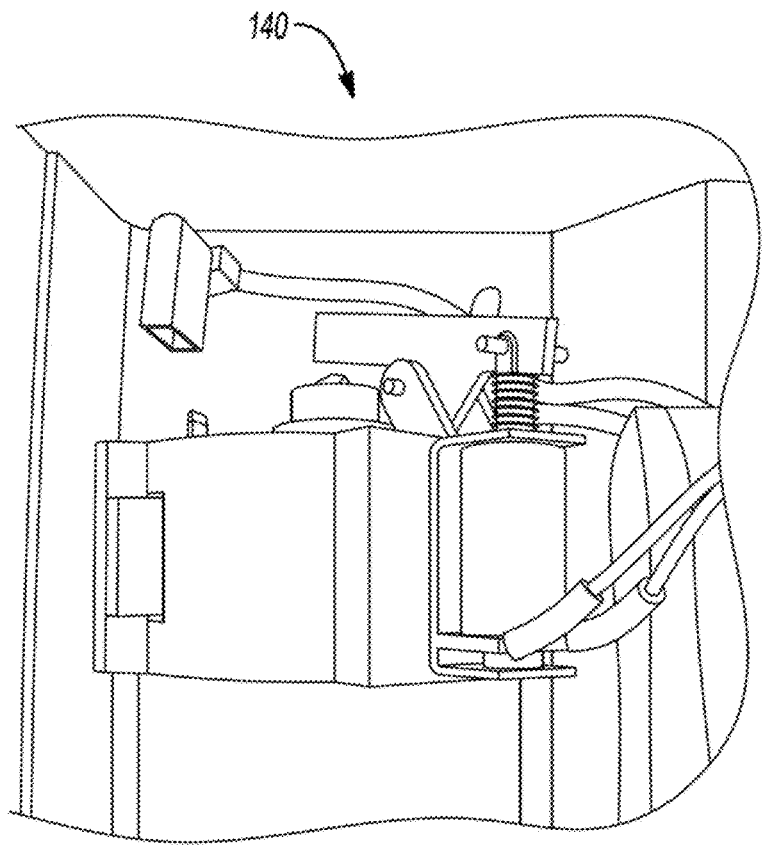
FIG. 28 depicts a lever attached to the electromechanical brake in a disengaged position according to one or more embodiments shown and described herein.
Figure 29:
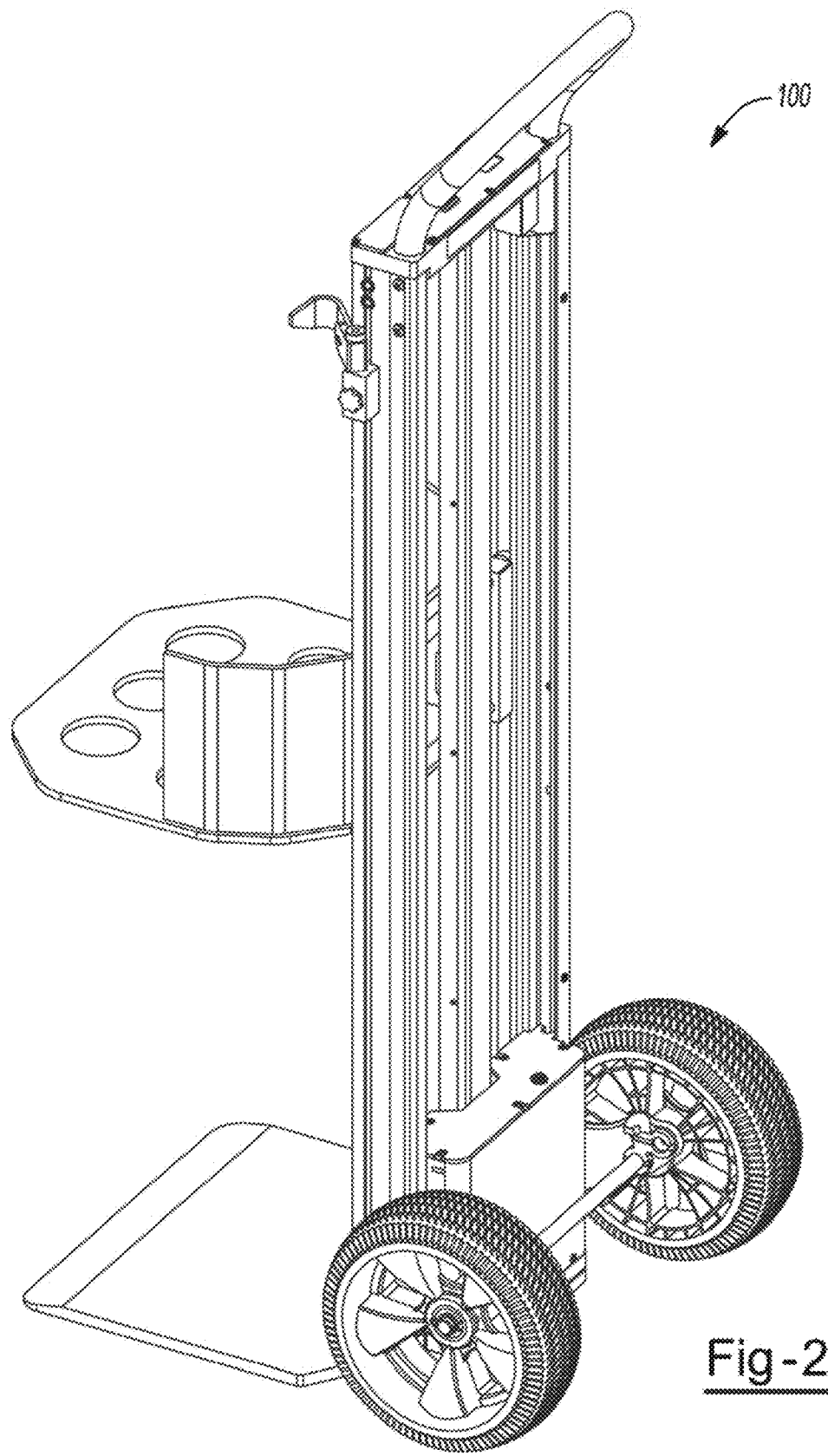
FIG. 29 depicts a perspective view of an attachment attached to the channel of the hand truck according to one or more embodiments shown and described herein.
Figure 30:
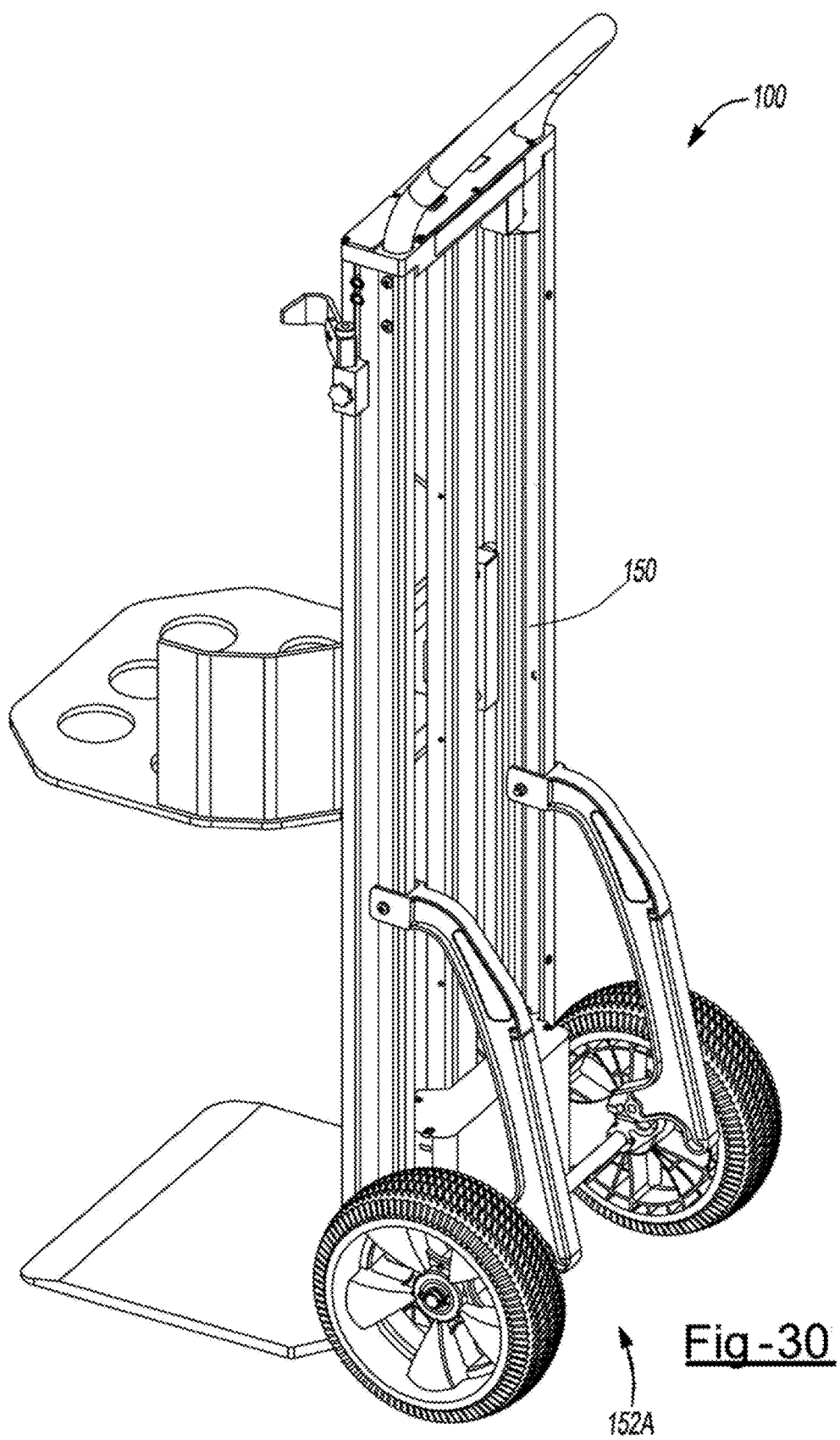
FIG. 30 depicts a perspective view of a stair lifter attached to the channel of the hand truck according to one or more embodiments shown and described herein.
Figure 31:
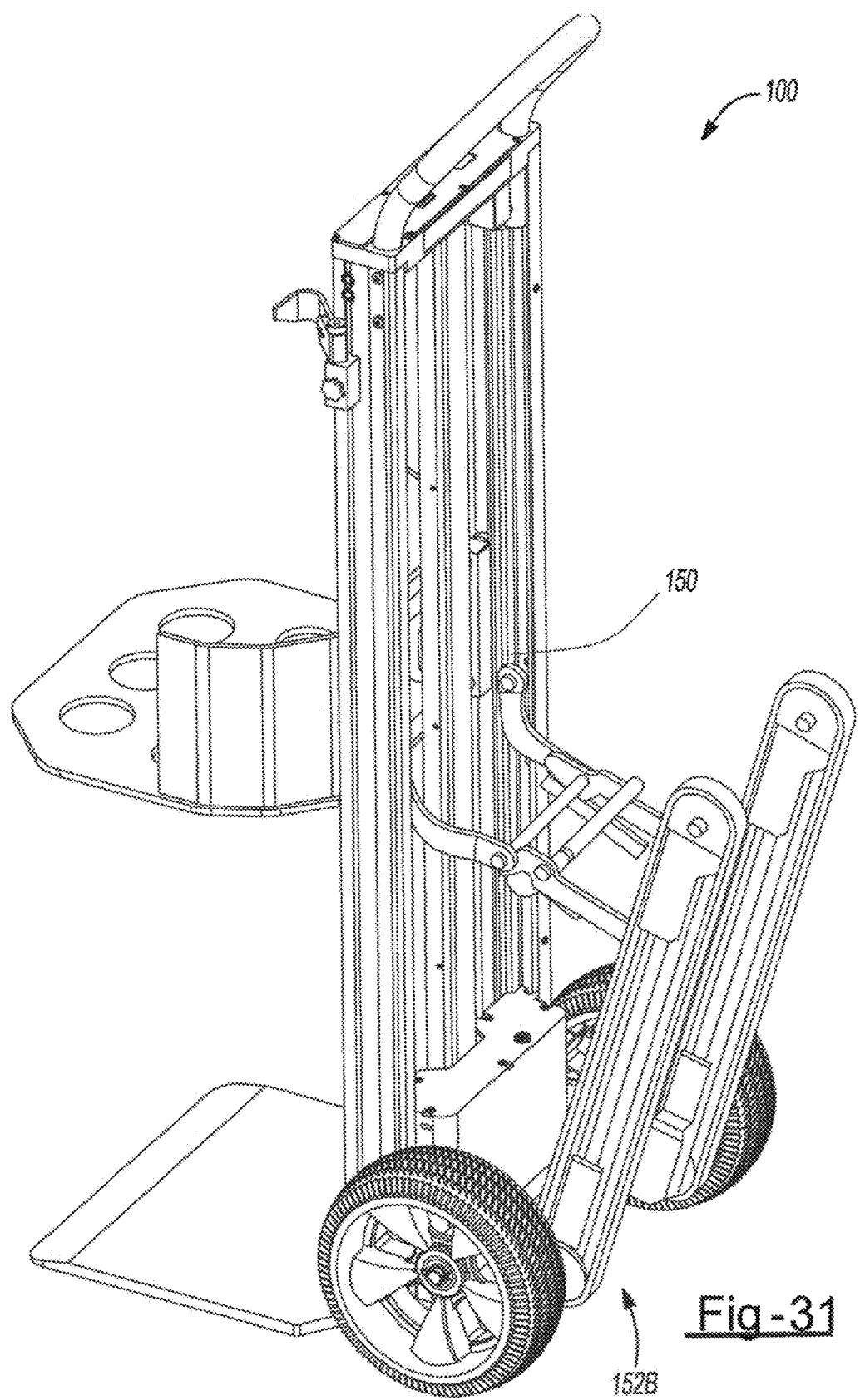
FIG. 31 depicts a perspective view of a tread climber attached to the channel of the hand truck according to one or more embodiments shown and described herein.

FIGS. 20 and 21 depict a spring assembly 130 having a spring 132 to improve vibration/shock damping characteristics of the hand truck. The spring 132 is made of any elastomeric, polymer, polymer-like, rubber, rubber-like, or spring material such as a mechanical spring . . . etc. material capable of providing vibration/shock damping properties. The spring 132 is positioned between a carriage connector 134 and a nut 136. The carriage connector 134 connects directly to the carriage 138 to move the load by means of the lead screw 108. When operator is going up or down stairs, the spring assembly contained in 130 reduces the "shock" to the load and machine with each stair impact. The spring assembly 130 also reduces shock to the load when the lifting nose travel is stopped, anywhere along the path.

Mechanical Motor Brake

An electromechanical motor brake assembly 140 is depicted in FIGS. 22-28. The electromechanical motor brake assembly 140 prevents the lifting nose from back driving when not actively being lifted (or lowered). When the user is not depressing the up/down switch, the motor 148 stops turning the lead screw 108. The lever 142 attached to a solenoid plunger rests on top of a component 144 the motor 148. The lever 142 is "keyed" to the component 144 upon actuation of a solenoid when the users stops the throttle, pulls the battery or the motor otherwise stops. The solenoid moves the lever to the unlocked position while the spring returns the lever 142 (spring loaded 146) to the locked position.

Modularity and Quick Attach Lifting Nose

Figure 32:
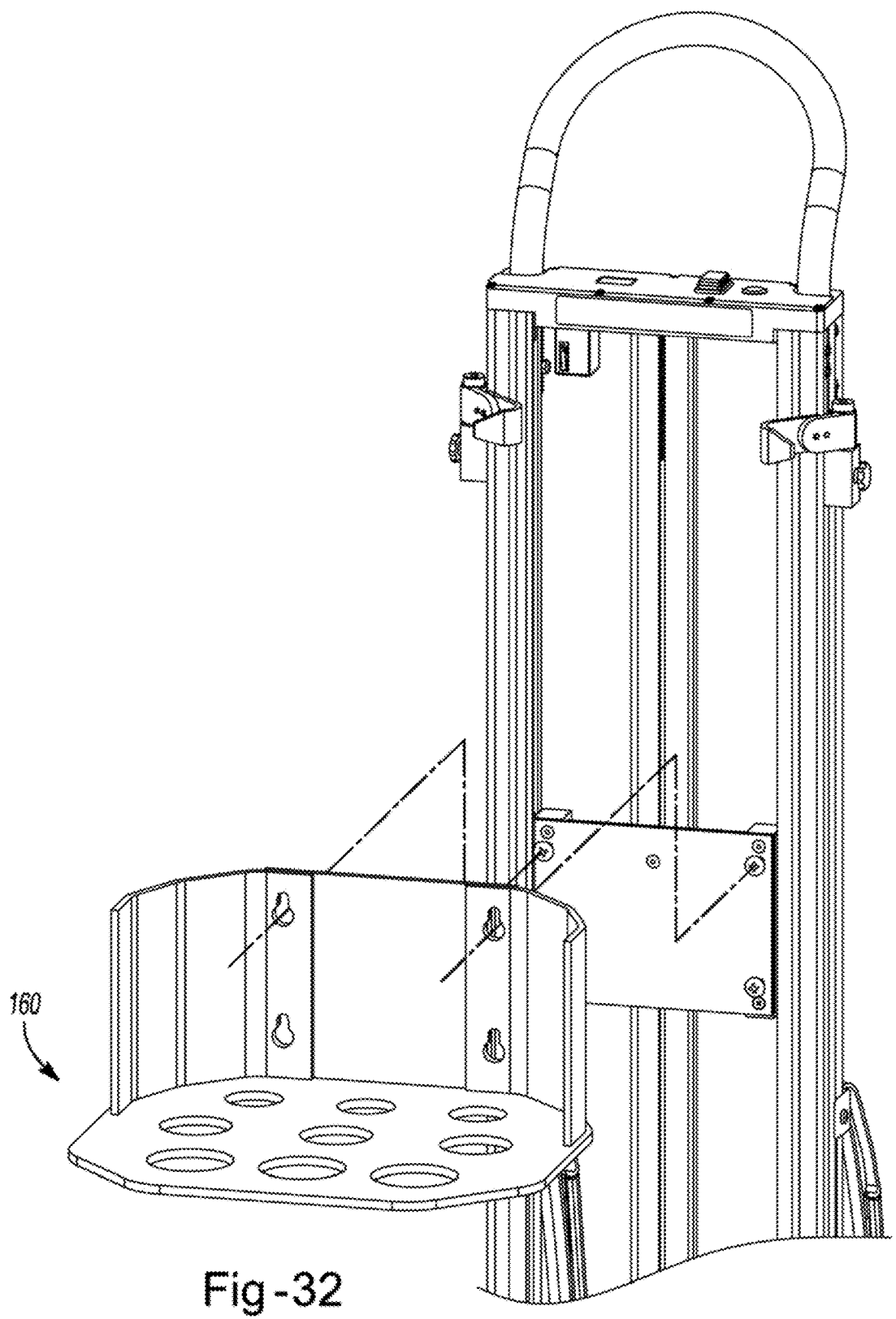
FIG. 32 depicts a keg holder to be attached to the hand truck according to one or more embodiments shown and described herein.
Figure 33:
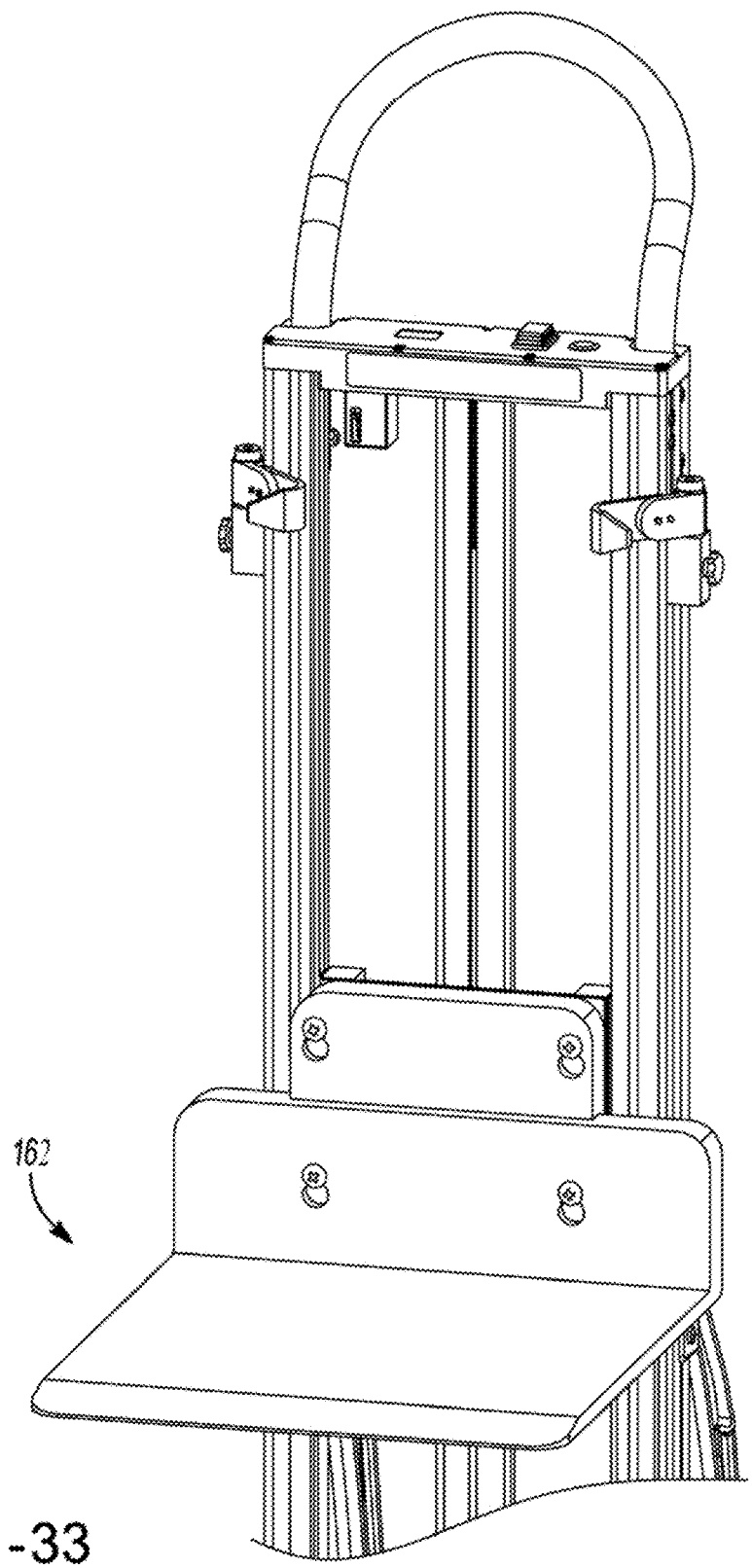
FIG. 33 depicts a L-plate to be attached to the hand truck according to one or more embodiments shown and described herein.

The hand truck 100 is configured in a modular manner to allow for different attachments (such as stair-climbers) by the user. As illustrated in FIGS. 29-33, the user can select different handles, wheels, noses, stair-climbing accessories, frame heights while utilizing the same lift system. This modularity is achieved by having a consistent channel 150 allowing accessories 152 to connect thereto (152A, 152B). Referring to FIGS. 32 and 33, the user may also use interchangeable lift plates. FIG. 32 depicts a keg lift plate 160 while FIG. 33 depicts a standard lift plate 162. It must be understood that various different attachments may be attached to the hand truck 100 and the embodiments shown herein are not limited only to a keg lift plate 160.

Figure 34:
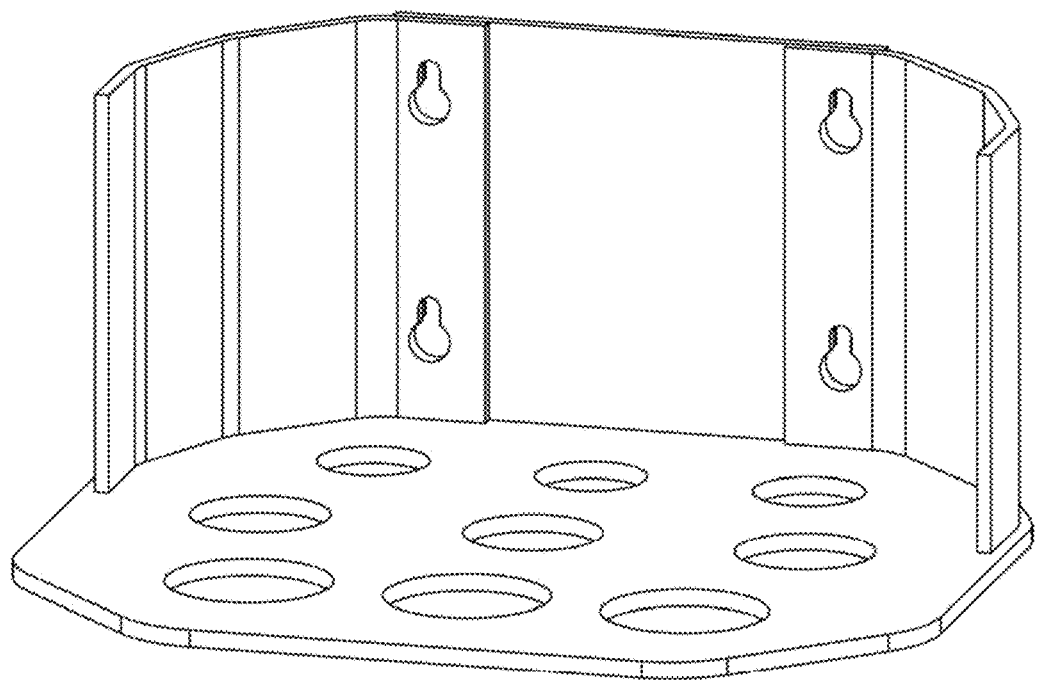
FIG. 34 depicts a keg holder to be attached to the hand truck according to one or more embodiments shown and described herein.
Figure 35:
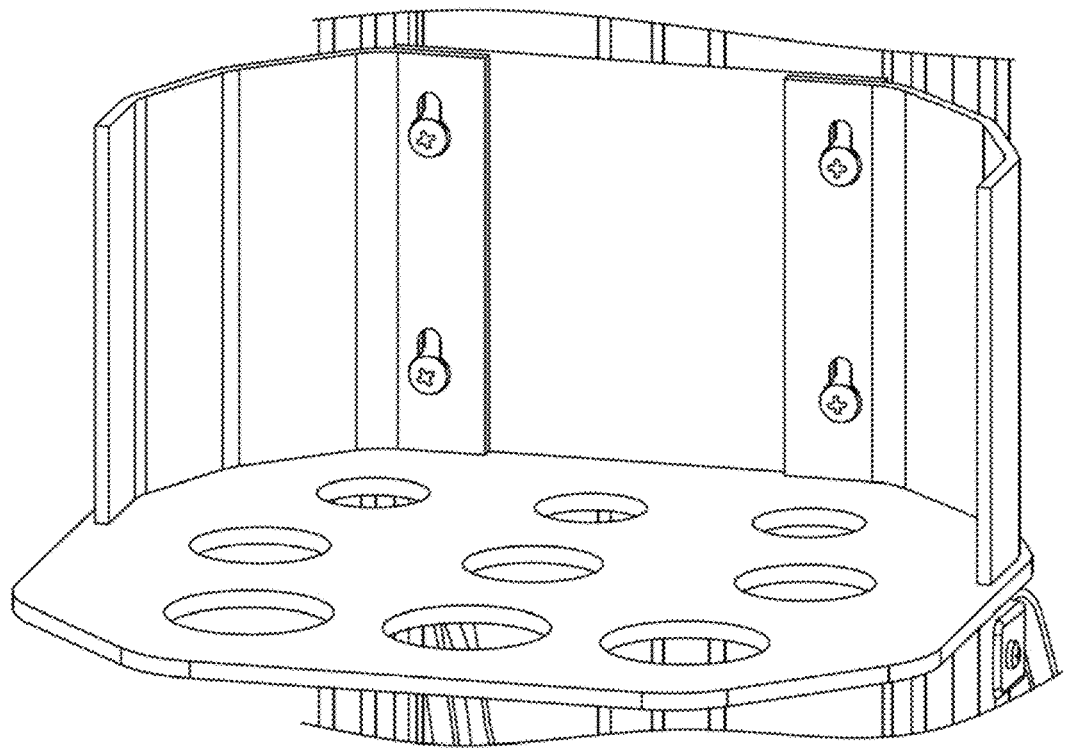
FIG. 35 depicts a keg holder partially attached to the hand truck according to one or more embodiments shown and described herein.
Figure 36:
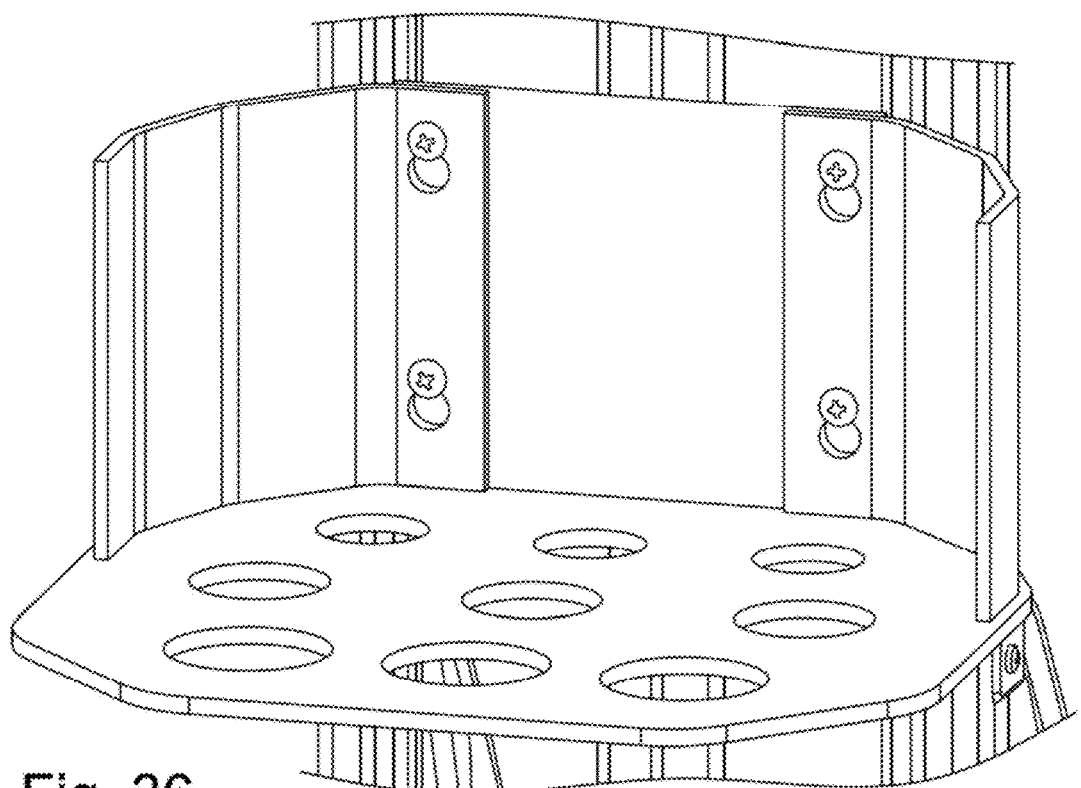
FIG. 36 depicts a keg holder bolted to and attached to the hand truck according to one or more embodiments shown and described herein.

Further, the lift plates 160 are configured to connect to the carriage in a quick attach configuration. Specifically, as shown in FIG. 34, the user aligns the larger slots to the bolts. As shown in FIG. 35, the user slides the nose down. Lastly, as shown in FIG. 36, the user tightens the bolts and the lift nose is ready for use. This same quick connect system may also be used with a standard lift plate or other attachments.

It should be noted that there could an embodiment with a direct connection to the carriage without the quick attach connection, such as described herein.

Switch at End of Travel

Figure 37:
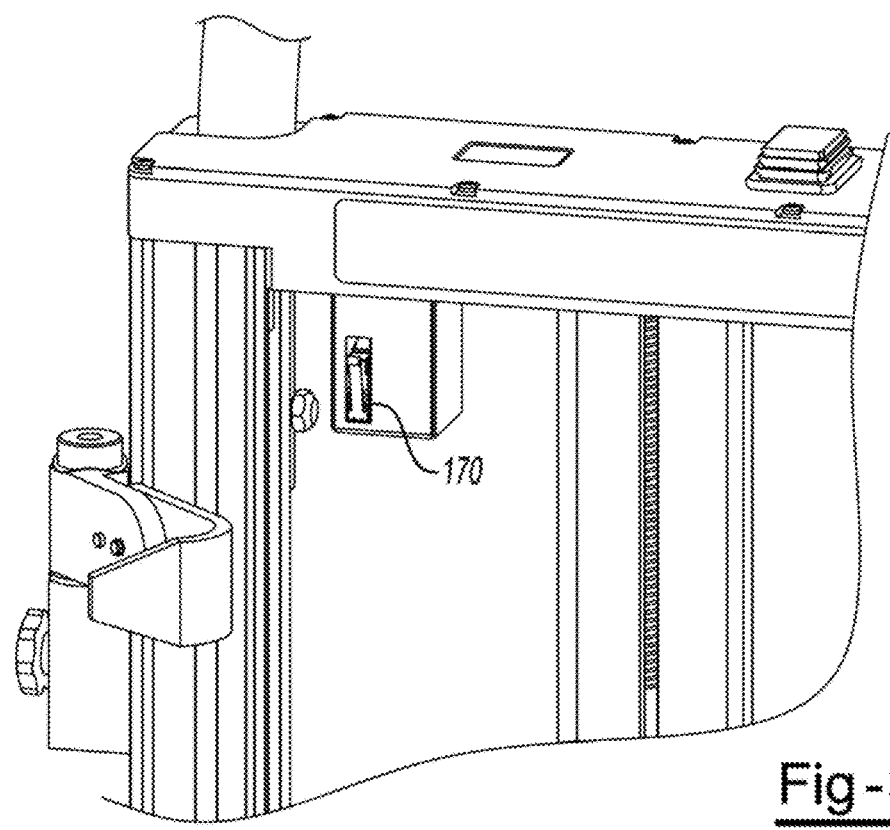
FIG. 37 depicts a limit switch at the top of travel according to one or more embodiments shown and described herein.

FIG. 37 illustrates a limit switch positioned at the top of the hand truck where travel of the lift nose is intended to stop. The limit switch 170 is configured to connect with the carriage at the top (and bottom, not pictured) of travel of the carriage. Once the carriage makes contact with the limit switch, the circuit to the controller is broken and the travel is automatically stopped. A similar limit switch is also position at the bottom of the hand truck to stop travel of the carriage.

Consistent Speed and Programmable Features

FIGS. 38-40 illustrate the control panel 170 of the hand truck 100. The general controls (up/down, power . . . etc.) are depicted in FIG. 38. FIG. 40 depicts a cutaway view of the control panel 170. The control panel 170 illustrating the top rotating portion 174 of the lead screw. This portion 174 rotates as the lead screw rotates during use. In the present embodiment, positioned adjacent is a reed switch 172 configured to measure the rotational speed of the lead screw. However, any other similarly equipped switch is also suitable. This rotation speed is used to determine the linear speed of the carriage and load.

Figure 41:
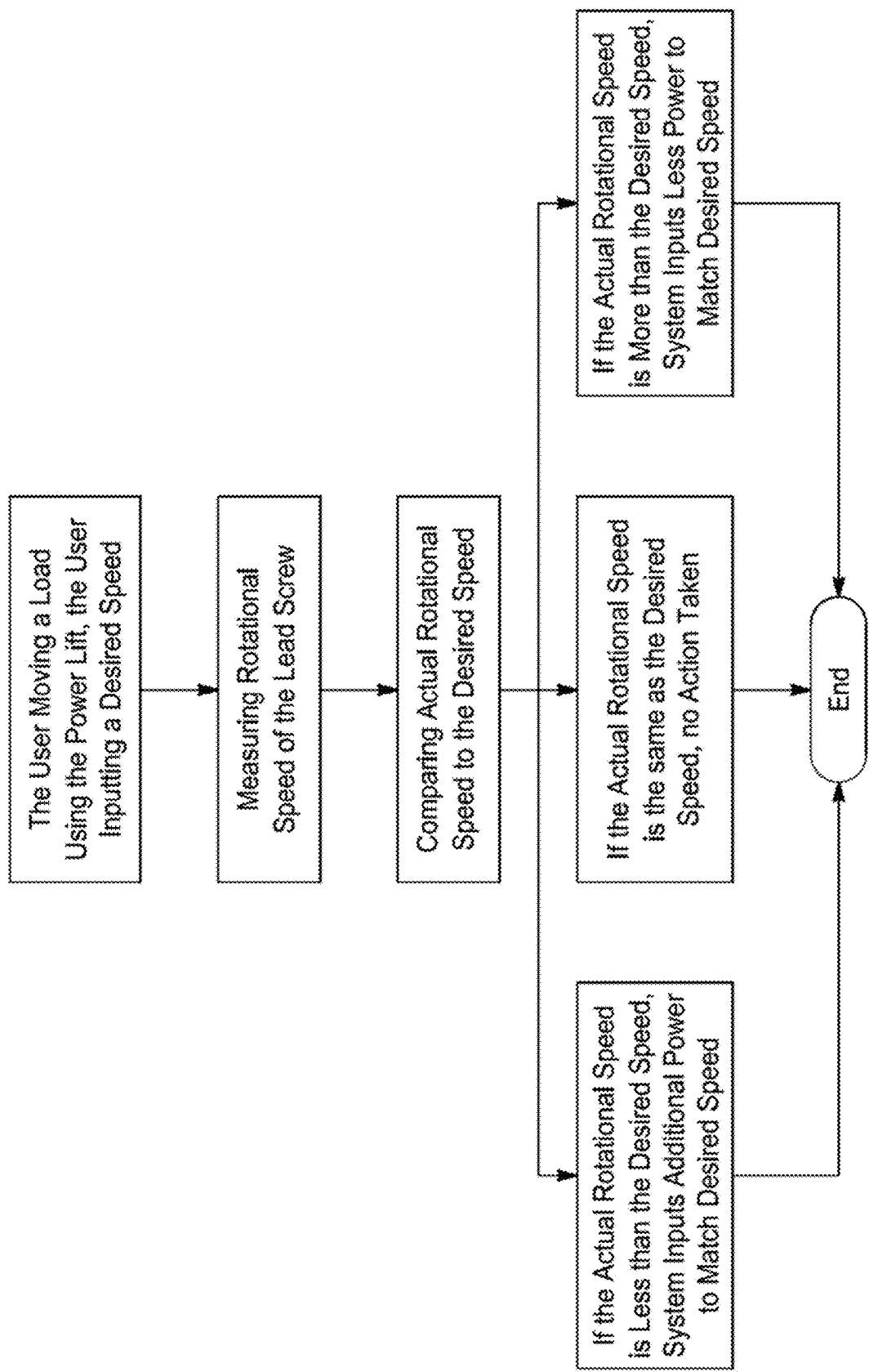
FIG. 41 depicts a flow chart of a system of controlling speed of the load according to one or more embodiments shown and described herein.

As illustrated in FIG. 41, the system uses the rotational speed to measure linear speed and enforce a consistent speed of the load. The system is programmed to lift/lower loads at the same speed, regardless of load overall weight. If, for example, the load is heavy, the system determines that the speed is below a predetermined threshold and increases the power so as to increase speed. The flow chart as illustrated in FIG. 41 details the process of maintaining a consistent linear speed of the load.

Furthermore, the software can be programmed to capture relevant usage data: non-volatile memory to retain information over time, serialization/manufacture date info, and/or track # of "cycles," The system may also have a programmable speed. Other options includes a programmable pre-set height range (i.e. user will only lift up 24 inches, so the use can press and release "Up" switch the truck automatically lifts only to 24 inches).

It is noted that the terms "substantially" and "about" may be utilized herein to represent the inherent degree of uncertainty that may be attributed to any quantitative comparison, value, measurement, or other representation.

These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

It is therefore intended that the appended claims cover all such changes and modifications that are within the scope of the claimed subject matter.

The invention claimed is:

1. A system for controlling lifting speed of a load bearing portion of a hand truck operated by a user, the system comprising:
   a lifting portion, the lifting portion configured to move a load from a first position to a second position;
   a lead screw, the lead screw integral to the movement of the lifting portion;
   a control portion, the control portion configured to receive a desired linear speed from the user, the desired speed having a corresponding desired rotational speed of the lead screw;
   a sensor, the sensor measuring an actual rotational speed of the lead screw; and
   a processor, the processor comparing the actual rotational speed to the desired rotational speed;
   wherein if the actual rotational speed is less than the desired rotational speed, additional power is applied until the actual rotational speed matches the desired rotational speed;

wherein if the actual rotational speed is greater than the desired rotational speed, power is decreased until the actual rotational speed matches the desired rotational speed; and wherein if the actual rotational speed is equal to the desired rotational speed, no action is taken.

2. The system of claim 1 wherein the sensor is a magnetic encoder.

3. The system of claim 2 wherein the magnetic encoder is positioned at the top of the rotating lead screw.

4. The system of claim 1 wherein the processor is programable to set a specific height, distance and/or speed of the load.

5. The system of claim 1 wherein the system further includes a memory device to store information relating to the hand truck.

6. The system of claim 5 wherein the memory device is configured to store information relating to the number of cycles, actual rotational speed and/or device information.

7. A method for controlling linear speed of a moving load on a hand truck operated by a user, the hand truck having a lead screw and a sensor configured to measure rotational speed, the method comprising the steps of:

receiving a desired linear speed from the user, the desired linear speed having a corresponding desired rotational speed for the lead screw;

measuring an actual rotational speed of the lead screw; and comparing the actual rotational speed to the desired rotational speed;

wherein if the actual rotational speed is less than the desired rotational speed, additional power is applied until the actual rotational speed matches the desired rotational speed;

wherein if the actual rotational speed is greater than the desired rotational speed, power is decreased until the actual rotational speed matches the desired rotational speed; and wherein if the actual rotational speed is equal to the desired rotational speed, no action is taken.

8. The method of claim 7 wherein the sensor is a magnetic encoder.

9. The method of claim 8 wherein the magnetic encoder is positioned at the top of the rotating lead screw.

* * * * *